United States Patent
Kim et al.

(10) Patent No.: US 11,983,355 B2
(45) Date of Patent: May 14, 2024

(54) ELECTRONIC DEVICE COMPRISING FLEXIBLE DISPLAY AND OPERATION METHOD THEREOF

(71) Applicant: SAMSUNG ELECTRONICS CO., LTD., Suwon-si (KR)

(72) Inventors: Kiwon Kim, Suwon-si (KR); Hyelin Lee, Suwon-si (KR); Dahee Lim, Suwon-si (KR); Byoungho Jung, Suwon-si (KR); Minjung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/116,078

(22) Filed: Mar. 1, 2023

(65) Prior Publication Data

US 2023/0205351 A1    Jun. 29, 2023

Related U.S. Application Data

(63) Continuation of application No. PCT/KR2021/016412, filed on Nov. 11, 2021.

(30) Foreign Application Priority Data

Nov. 18, 2020  (KR) .................. 10-2020-0154740
Jan. 13, 2021  (KR) .................. 10-2021-0004949

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1652* (2013.01); *G06F 3/0412* (2013.01);
(Continued)

(58) Field of Classification Search
CPC ...... G06F 3/017; G06F 3/0416; G06F 3/0412; G06F 3/044; G06F 3/0448
See application file for complete search history.

(56) References Cited

U.S. PATENT DOCUMENTS 8,775,966 B2 *  7/2014  Stolyarov ........... G06F 3/04845
                                                        715/784
2015/0160699 A1   6/2015  Choi et al.
(Continued)

FOREIGN PATENT DOCUMENTS

KR   10-2015-0065415   6/2015
KR   10-2016-0092877   8/2016
(Continued)

OTHER PUBLICATIONS

International Search Report for PCT/KR2021/016412 dated Nov. 2, 2022, 3 pages.
(Continued)

*Primary Examiner* — Sardis F Azongha
(74) *Attorney, Agent, or Firm* — Nixon & Vanderhye P.C.

(57) ABSTRACT

An electronic device may include a first structure, a second structure, a flexible display, at least one sensor, and at least one processor, wherein the at least one processor may be configured to: obtain information on a state of the first structure with respect to the second structure via the at least one sensor; detect a touch input via the at least one sensor; based on the information on the state of the first structure with respect to the second structure, identify a portion of the flexible display where the touch input is detected between a first portion visually exposed to an outside and a second portion accommodated in an inside of the second structure in the flexible display; and based on the identified portion
(Continued)

being the second portion, perform a function associated with a screen displayed via the first portion, based on the touch input.

20 Claims, 16 Drawing Sheets

(51) Int. Cl.
*G06F 3/044* (2006.01)
*G06F 3/0488* (2022.01)

(52) U.S. Cl.
CPC ............ *G06F 3/044* (2013.01); *G06F 3/0488* (2013.01); *G06F 2203/04102* (2013.01); *G06F 2203/04108* (2013.01)

(56) References Cited

U.S. PATENT DOCUMENTS

| | | | |
|---|---|---|---|
| 2015/0234507 A1 | 8/2015 | Chun et al. | |
| 2016/0034132 A1 | 2/2016 | Huang et al. | |
| 2016/0364139 A1 | 12/2016 | Kim et al. | |
| 2017/0199614 A1* | 7/2017 | Lee | G06F 3/0416 |
| 2017/0351351 A1 | 12/2017 | Kim et al. | |
| 2018/0067638 A1 | 3/2018 | Klein et al. | |
| 2019/0012007 A1 | 1/2019 | Kim et al. | |
| 2019/0028579 A1 | 1/2019 | Cho et al. | |
| 2019/0261519 A1 | 8/2019 | Park et al. | |
| 2019/0302984 A1 | 10/2019 | Zhang et al. | |
| 2019/0346954 A1 | 11/2019 | Jung et al. | |
| 2020/0050416 A1 | 2/2020 | Myung et al. | |
| 2020/0371558 A1 | 11/2020 | Kim et al. | |

FOREIGN PATENT DOCUMENTS

| | | |
|---|---|---|
| KR | 10-2017-0082926 | 7/2017 |
| KR | 10-2017-0100485 | 9/2017 |
| KR | 10-2019-0005354 | 1/2019 |
| KR | 10-2019-0086305 | 7/2019 |
| KR | 10-2019-0101184 | 8/2019 |
| KR | 10-2019-0128843 | 11/2019 |
| KR | 10-2020-0128493 | 11/2020 |

OTHER PUBLICATIONS

Written Opinion of the ISA for PCT/KR2021/016412 dated Nov. 2, 2022, 4 pages.

* cited by examiner

ELECTRONIC DEVICE COMPRISING FLEXIBLE DISPLAY AND OPERATION METHOD THEREOF

CROSS REFERENCE TO RELATED APPLICATIONS

This application is a continuation of International Application No. PCT/KR2021/016412 filed on 11 Nov. 2021, designating the United States, in the Korean Intellectual Property Receiving Office, and claiming priority to KR 10-2020-0154740, filed Nov. 18, 2020, and Korean Patent Application No. KR 10-2021-0004919, filed Jan. 13, 2021, the disclosures of which are all hereby incorporated by reference herein in their entireties.

BACKGROUND

Field

Various example embodiments relate to an electronic device including a flexible display and a method for operating the same.

Description of Related Art

As the demand for mobile communication increases, and the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may come more compact while functioning as an input device.

Use of an electronic device with a larger screen may give more convenience in, e.g., web browsing or multimedia playing. A larger display may be adopted to output a larger screen. However, this way may be limited by the portability of the electronic device.

Recently, development of flexible displays is booming and flourishes. A flexible display may be mounted on an electronic device in a form that is slidable, foldable or bendable, or rollable. An electronic device including a flexible display may provide an extended or contracted screen according to the user's need.

SUMMARY

In an electronic device including a flexible display (e.g., a slidable display) in which an area visually exposed to the outside is extendable, the user may have difficulty in using the electronic device with one hand. For example, it may be hard for the user to touch a portion of the flexible display in the extended state with the hand (e.g., fingers) gripping the electronic device.

Various example embodiments relate to an electronic device including a flexible display and a method for operating the same, which are capable of performing functions (e.g., functions related to the screen displayed through the flexible display of the electronic device) of the electronic device based on input to the rear surface of the electronic device.

According to various example embodiments, an electronic device may comprise a first structure, a second structure guiding a slide of the first structure, a flexible display at least partially received in an inside of the second structure or visually exposed to an outside of the second structure according to the slide of the first structure, at least one sensor, and at least one processor operably connected, directly or indirectly, with the flexible display and the at least one sensor. The at least one processor may be configured to obtain information about a state of the first structure with respect to the second structure through the at least one sensor, detect a touch input through the at least one sensor, identify a portion of the flexible display, where the touch input is detected, between a first portion visually exposed to the outside and a second portion received in the inside of the second structure in the flexible display, based on the information about the state of the first structure with respect to the second structure, and based on the identified portion being the second portion, perform a function related to a screen displayed through the first portion, based on the touch input.

According to various example embodiments, a method for operating an electronic device may comprise obtaining information about a state of a first structure with respect to a second structure, through at least one sensor of the electronic device including the first structure, the second structure guiding a slide of the first structure, a flexible display at least partially received in an inside of the second structure or visually exposed to an outside of the second structure according to the slide of the first structure, and the at least one sensor, detecting a touch input through the at least one sensor, identifying a portion of the flexible display, where the touch input is detected, between a first portion visually exposed to the outside and a second portion received in the inside of the second structure in the flexible display, based on the information about the state of the first structure with respect to the second structure, and based on the identified portion being the second portion, performing a function related to a screen displayed through the first portion, based on the touch input.

According to various example embodiments, the electronic device including the flexible display and/or method for operating the same may perform the function of the electronic device based on input to the rear surface of the electronic device, allowing the user to use the electronic device with one hand.

Further, according to various example embodiments, the electronic device including the flexible display and/or method for operating the same enable configuration of a function of the electronic device, corresponding to user input to the rear surface of the electronic device.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
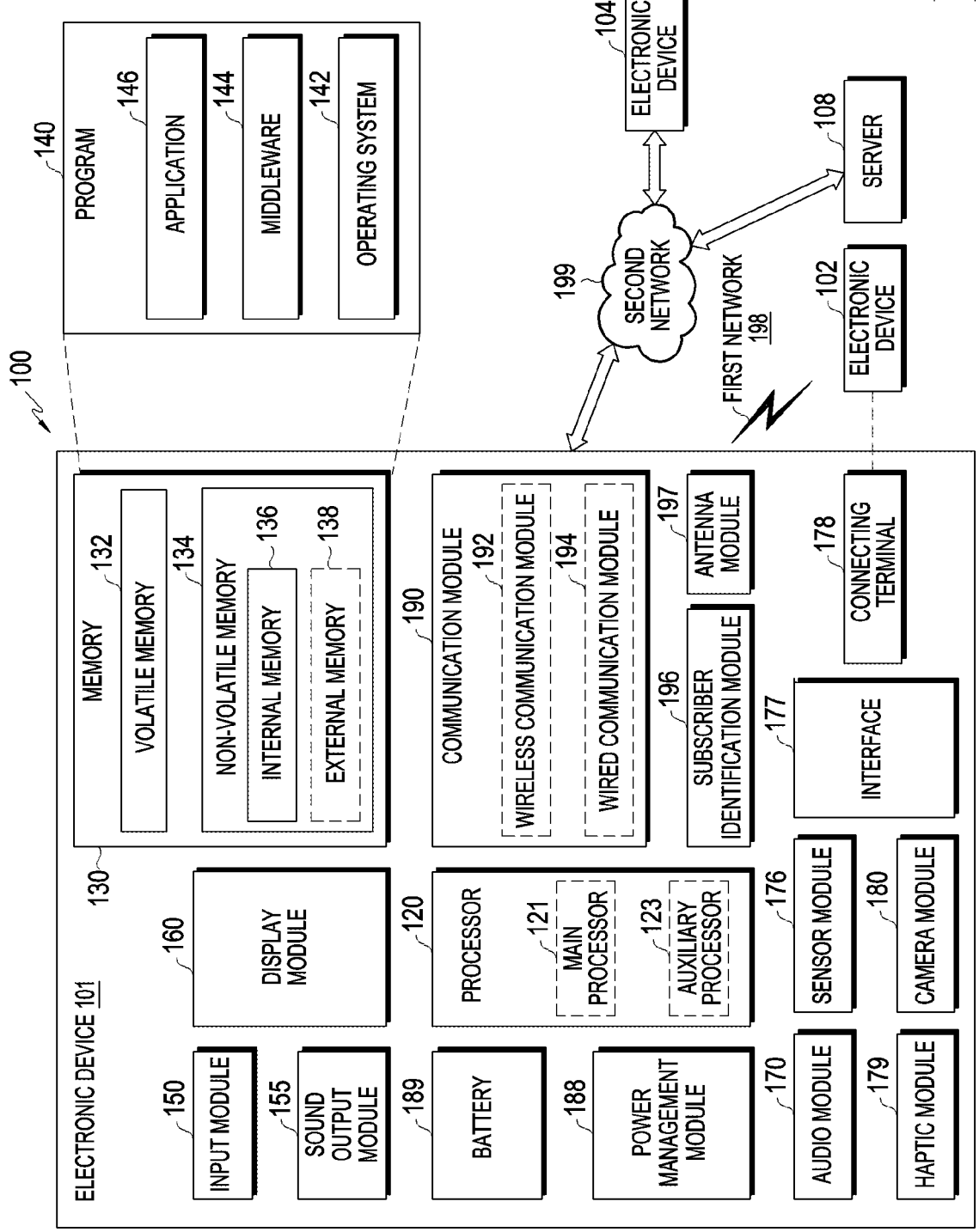
FIG. 1 is a view illustrating an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
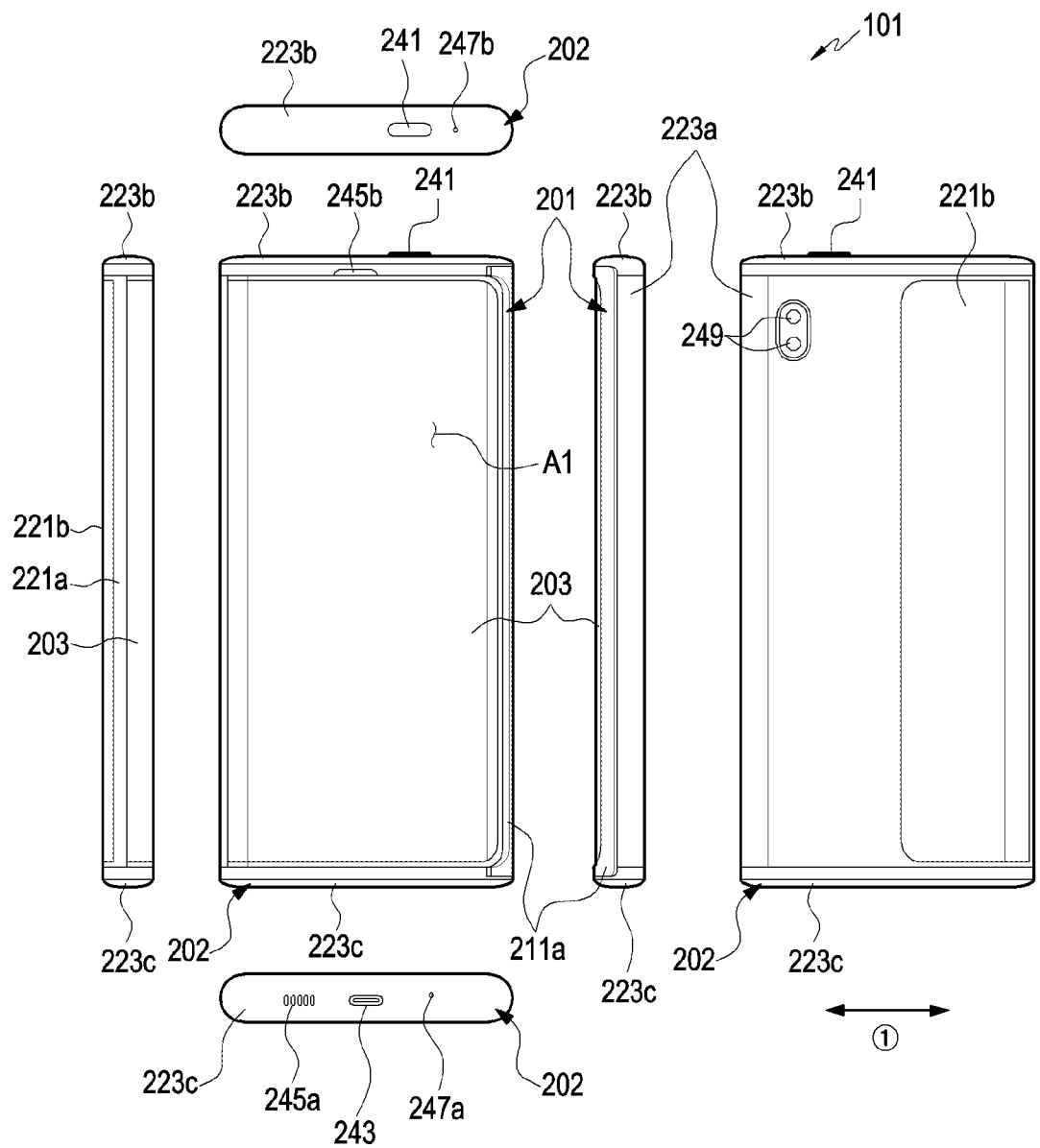
FIG. 2 is a view illustrating an electronic device according to an example embodiment, wherein most of a flexible display is exposed to the outside of a second structure.

FIG. 2 is a view illustrating an electronic device 101 according to various example embodiments, wherein a portion (e.g., a portion of a second area A2) of a flexible display 203 is received in a second structure 202.

Figure 3:
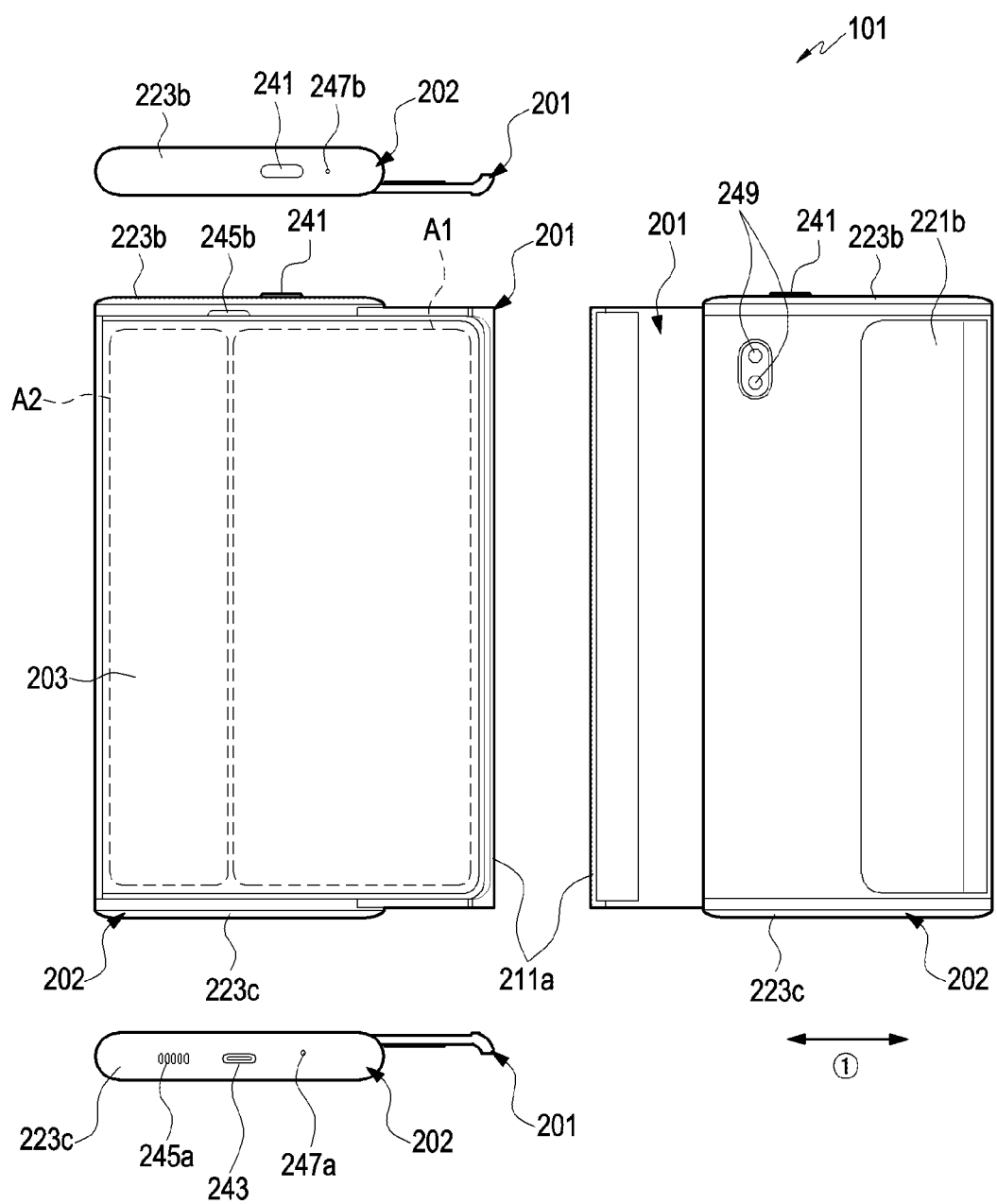
FIG. 3 is an exploded perspective view illustrating an electronic device according to various example embodiments.

FIG. 3 is a view illustrating an electronic device 101 according to an embodiment, wherein most of a flexible display 203 is exposed to the outside of a second structure 202.

The state shown in FIG. 2 may be defined as a first structure 201 being closed with respect to a second structure 202, and the state shown in FIG. 3 may be defined as the first structure 201 being open with respect to the second structure 202. According to an embodiment, the "closed state" or "opened state" may be defined as a closed or open state of the electronic device.

Referring to FIGS. 2 and 3, an electronic device 101 may include a first structure 201 and a second structure 202 disposed to be movable in the first structure 201. According to an embodiment, the electronic device 101 may be interpreted as having a structure in which the first structure 201 is slidably disposed on the second structure 202. According to an embodiment, the first structure 201 may be disposed to perform reciprocating motion by a predetermined distance in a predetermined direction with respect to the second structure 202, for example, a direction indicated by an arrow ①.

According to an embodiment, the first structure 201 may be referred to as, for example, a first housing, a slide unit, or a slide housing, and may be disposed to reciprocate on the second structure 202. According to an embodiment, the second structure 202 may be referred to as, for example, a second housing, a main part, or a main housing, and may receive various electric or electronic components such as a main circuit board or a battery. A portion (e.g., the first area A1) of the flexible display 203 may be seated on the first structure 201. According to an embodiment, another portion (e.g., the second area A2) of the display 203 may be received (e.g., slide-in) into the inside of the second structure 202 or exposed (e.g., slide-out) to the outside of the second structure 202 as the first structure 201 moves (e.g., slides) relative to the second structure 202.

According to various embodiments, the first structure 201 may include a first plate 211a (e.g., a slide plate) and may include a first surface formed to include at least a portion of the first plate 211a and a second surface facing in the direction opposite to the first surface. According to an embodiment, the second structure 202 may include a second plate 221a (e.g., a rear case), a first sidewall 223a extending from the second plate 221a, a second sidewall 223b extending from the first sidewall 223a and the second plate 221a, a third sidewall 223c extending from the first sidewall 223a and the second plate 221a and positioned parallel to the second sidewall 223b, and/or a rear plate 221b (e.g., a rear window). According to an embodiment, the second sidewall 223b and the third sidewall 223c may be formed to be perpendicular to the first sidewall 223a. According to an embodiment, the second plate 221a, the first sidewall 223a, the second sidewall 223b, and the third sidewall 223c may be formed to have an opening (e.g., in the front face) to receive (or surround) at least a portion of the first structure 201. For example, the first structure 201 may be coupled to the second structure 202 in a state in which it is at least partially surrounded, and the first structure 201 may be guided by the second structure 202 to slide in a direction parallel to the first surface or the second surface, for example, direction indicated with the arrow ①.

According to various embodiments, the second sidewall 223b or the third sidewall 223c may be omitted. According to an embodiment, the second plate 221a, the first sidewall 223a, the second sidewall 223b, and/or the third sidewall 223c may be formed as separate structures and may be combined or assembled. The rear plate 221b may be coupled to surround at least a portion of the second plate 221a. In some embodiments, the rear plate 221b may be formed substantially integrally with the second plate 221a. According to an embodiment, the second plate 221a or the rear plate 221b may cover at least a portion of the flexible display 203. For example, the flexible display 203 may be at least partially received inside the second structure 202, and the second plate 221a or the rear plate 221b may cover the portion of the flexible display 203 received inside the second structure 202.

According to various embodiments, the first structure 201 may be moved in an open state or closed state with respect to the second structure 202 in a first direction (e.g., direction ①) parallel with the second plate 221a (e.g., the rear case) and the second side wall 223b to be positioned a first distance away from the first side wall 223a in the closed state and be positioned a second distance away from the first side wall 223a in the open state, wherein the second distance is larger than the first distance. In some embodiments, when in the closed state, the first structure 201 may be positioned to surround a portion of the first sidewall 223a.

According to various embodiments, the second structure 202 may at least partially include of a non-conductive material (e.g., a polymer material (e.g., plastic), glass, or ceramic). For example, the second structure 202 may be formed by combining a conductive housing and a plate formed of a polymer material.

According to various embodiments, the electronic device 101 may include a display 203, a key input device 241, a connector hole 243, audio modules 245a, 245b, 247a, and 247b, or a camera module 249 comprising at least one camera. Although not shown, the electronic device 101 may further include an indicator (e.g., a light emitting diode (LED) device) or various sensor modules.

According to various embodiments, the display 203 may include the first area A1 and the second area A2. In an embodiment, the first area A1 may extend substantially across at least a portion of the first surface and may be disposed on the first surface. The second area A2 may extend from the first area A1 and be inserted or received into the inside of the second structure 202 (e.g., housing) or be exposed to the outside of the second structure 202 as the first structure 201 slides. As is described below, the second area A2 may be moved while being substantially guided by a roller (not shown) mounted on the second structure 202 and may thus be received into the inside of or exposed to the outside of the second structure 202. For example, while the first structure 201 slides, a portion of the second area A2 may be deformed into a curved shape in a position corresponding to the roller.

According to various embodiments, when viewed from the top of the first plate 211a (e.g., slide plate), when the first structure 201 moves from the closed state to the opened state, the second area A2 may be gradually exposed to the outside of the second structure 202 to be substantially coplanar with the first area A1. The flexible display 203 may be disposed to be coupled with, or adjacent, a touch detecting circuit, a pressure sensor capable of measuring the strength (pressure) of touches, and/or a digitizer for detecting a magnetic field-type stylus pen. In an embodiment, the second area A2 may be at least partially received inside the second structure 202, and a portion of the second area A2 may be visually exposed to the outside even in the state shown in FIG. 1 (e.g., the closed state). In some embodiments, irrespective of the closed state or the open state, the exposed portion of the second area A2 may be positioned on the roller and, in a position corresponding to the roller, a portion of the second area A2 may maintain the curved shape.

The key input device 241 may be disposed on the second sidewall 223b or the third sidewall 223c of the second structure 202. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to an embodiment, at least a portion of the key input device 241 may be positioned on an area of the first structure 201.

According to various embodiments, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed on the third side wall 223c but without limitations thereto, the connector hole 243 or a connector hole not shown may be disposed on the first side wall 223a or the second sidewall 223b.

According to various embodiments, the audio modules 245a, 245b, 247a, and 247b may include speaker holes 245a and 245b or microphone holes 247a and 247b. One of the speaker holes 245a and 245b may be provided as a receiver hole for voice calls, and the other may be provided as an external speaker hole. The microphone holes 247a and 247b may have a microphone inside to obtain external sounds. According to an embodiment, there may be a plurality of microphones to be able to detect the direction of a sound. In some embodiments, the speaker holes 245a and 245b and the microphone holes 247a and 247b may be implemented as one hole, or a speaker may be included without the speaker holes 245a and 245b (e.g., a piezo speaker). According to, the speaker hole indicated by the reference number "245b" may be disposed in the first structure 201 and used as a receiver hole for voice calls, and the speaker hole indicated by the reference number "245a" (e.g., an external speaker hole) or the microphone holes 247a and 247b may be disposed in the second structure 202 (e.g., one of the sidewalls 223a, 223b, and 223c).

The camera module 249 may be provided on the second structure 202 and may capture a subject in a direction opposite to the first area A1 of the display 203. The electronic device 101 may include a plurality of camera modules 249. For example, the electronic device 101 may include a wide-angle camera, a telephoto camera, or a close-up camera, and according to an embodiment, by including an infrared projector and/or an infrared receiver, the electronic device 101 may measure the distance to the subject. The camera module 249 may include one or more lenses, an image sensor, and/or an image signal processor. Although not shown, the electronic device 101 may further include a camera module (e.g., a front camera) that captures the subject in a direction opposite to the first area A1 of the display 203. For example, the front camera may be disposed around the first area A1 or in an area overlapping the display 203 and, when disposed in the area overlapping the display 203, the front camera may capture the subject via the display 203.

According to various embodiments, an indicator (not shown) of the electronic device 101 may be disposed on the first structure 201 and/or the second structure 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
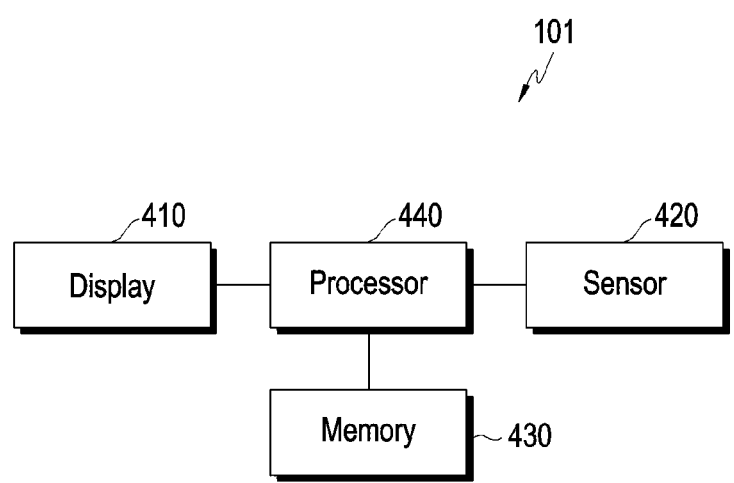
FIG. 4 is a block diagram illustrating an electronic device according to various example embodiments.

FIG. 4 is a block diagram illustrating an electronic device 101 according to various embodiments.

Referring to FIG. 4, in an embodiment, an electronic device 101 may include a display 410, a sensor 420, a memory 430, and a processor 440. In an embodiment, although not shown in FIG. 4, the electronic device 101 may further include the first structure 201 and the second structure 202 of FIGS. 2 and 3, where the display 410, the sensor 420, the memory 430, and the processor 440 are disposed.

In an embodiment, the display 410 may be the same as the display module 160 of FIG. 1 or the display 203 of FIGS. 2 and 3. For example, the display 410 may be a flexible display including a first area mounted on a first surface of the first structure 201 and a second area extending from the first area. As the first structure 201 slides, the second area of the display 410 may be at least partially received from one side of the second structure 202 to the inside of the second structure 202 or be visually exposed to the outside of the second structure 202.

Hereinafter, at least a portion of the display 410 visually exposed to the outside according to the slide of the first structure 201 is denoted as a 'first portion of the display', and at least a portion of the portion of the display 410 received (or inserted) in the second structure 202 is denoted as a 'second portion of the display.' For example, the first portion of the display may be at least a portion of the portion of the display 410 visually exposed to the outside in a state in which the first structure 201 is closed with respect to the second structure 202, a state in which the first structure 201 is opened with respect to the second structure 202, and an intermediate state (hereinafter, referred to as an 'intermediate state') between the closed state and opened state of the first structure 201. The second portion of the display may be at least a portion of the portion of the display 410 not visually exposed to the outside, in the closed state, opened state, and intermediate state.

In an embodiment, in the above-described example and the examples of FIGS. 2 and 3, the display 410 is exemplified as a slidable display, but is not limited thereto. For example, the display 410 may be a foldable, bendable, or rollable display.

In an embodiment, the sensor 420 may be at least partially identical or similar to the sensor module 176 of FIG. 1 or the sensor module (not shown) of FIG. 2.

In an embodiment, the sensor 420 may include a touch sensor (also referred to as a 'touch panel').

In an embodiment, the touch sensor may detect a touch by the user. In an embodiment, the touch sensor may detect a hovering by the user (e.g., the user's finger) positioned within a designated distance from the electronic device 101, as well as a touch detected as the user (e.g., the user's finger) contacts the electronic device 101.

In the above-described example, the touch sensor is exemplified as included in the sensor 420 but, in an embodiment, the touch sensor may be included in the display 410. In the following description, the touch sensor is assumed to be included in the display 410.

In an embodiment, the touch sensor may obtain (e.g., generate) information about the state (e.g., the closed state, intermediate state, or opened state) of the first structure 201 with respect to the second structure 202. For example, the touch sensor, along with the display 410, may be slid as the first structure 201 slides. When the touch sensor is implemented in a capacitive type, the electric field (or capacitance) (e.g., a change in electric field) detected by a curved portion (e.g., the touch sensor portion included in the display portion 1031 between point M (or line) and point N (or line) of FIG. 10) around the rotational axis of the roller (e.g., the roller 251 of FIG. 7) in the touch sensor may differ from the electric field detected by a flat portion (e.g., the touch sensor portion included in the display portion 1011 or display portion 1032 of FIG. 10) in the touch sensor. Further, when the touch sensor is implemented in a capacitive type, the electric field detected by the touch sensor portion covered by the second plate 221a may differ from the electric field detected by the touch sensor portion not covered by the second plate 221a, for example. The touch sensor may obtain information about the electric field detected by each portion of the touch sensor, as information about the state of the first structure 201 with respect to the second structure 202.

In an embodiment, the sensor 420 may include a sensor for obtaining information about the state of the first structure 201 with respect to the second structure 202, in addition to the touch sensor.

In an embodiment, the sensor 420 may include a hall sensor capable of obtaining information about the state of the first structure 201 with respect to the second structure 202. In an embodiment, a plurality of hall sensors may be disposed on the second structure 202, a magnet may be disposed on the first structure 201. As the first structure 201 slides, the magnet disposed on the first structure 201 may vary. The plurality of hall sensors disposed on the second structure 202 may detect the magnetic field formed by the magnet and varied depending on the position of the magnet. The hall sensors may obtain the information about the state of the first structure 201 with respect to the second structure 202 by detecting the magnetic field formed by the magnet.

In an embodiment, the sensor 420 may include an optical sensor capable of obtaining information about the state of the first structure 201 with respect to the second structure 202. In an embodiment, the second structure 202 may be disposed on an optical pattern, and an optical sensor (e.g., a photo detector) may be disposed on the first structure 201. As the first structure 201 slides, the position of the optical sensor disposed on the first structure 201 may be moved. The photo detector may obtain the information about the state of the first structure 201 with respect to the second structure 202 by detecting the optical pattern disposed on the second structure 202.

In an embodiment, the sensor 420 may include an inertial sensor (also referred to as a 'motion sensor') capable of obtaining the information about the state of the first structure 201 with respect to the second structure 202. In an embodiment, accelerometers (e.g., 6-axis accelerometers) may be disposed on each of the first structure 201 and the second structure 202. The accelerometers may obtain information about the relative position (or change in position) of the first structure 201 with respect to the second structure 202, as the information about the state of the first structure 201 with respect to the second structure 202.

In an embodiment, the sensor 420 may include a pressure sensor capable of obtaining information about the state of the first structure 201 with respect to the second structure 202. In an embodiment, the pressure sensor may be included in the display 410. In an embodiment, as the first structure 201 moves with respect to the second structure 202, the pressure detected at the curved portion in the display 410 may differ from the pressure detected at the flat portion in the display 410. The pressure sensor may obtain information about the pressure detected by the pressure sensor, as the information about the state of the first structure 201 with respect to the second structure 202.

In an embodiment, the sensor 420 may include an illuminance sensor capable of obtaining information about the state of the first structure 201 with respect to the second structure 202. In an embodiment, each of a plurality of portions of the display 410 may transmit a different amount of external light (e.g., each of the plurality of portions of the display 410 may be implemented to have a different blocking rate for external light). At least one illuminance sensor disposed on the second structure 202 may detect the amount of external light (or a change in the amount of external light) detected by the illuminance sensor according to a slide of the first structure 201, obtaining the information about the state of the first structure 201 with respect to the second structure 202.

In an embodiment, the sensor 420 may include a rotational angle sensor capable of obtaining information about the state of the first structure 201 with respect to the second structure 202. In an embodiment, at least one rotational angle sensor disposed on the roller 251 (e.g., see FIG. 7) may detect the amount of rotational angle (or a change in the amount of rotational angle) detected by the rotational angle sensor according to a slide of the first structure 201, obtaining the information about the state of the first structure 201 with respect to the second structure 202. In an embodiment, although not shown in FIG. 4, the electronic device 101 may include devices for obtaining the information about the state of the first structure 201 with respect to the second structure 202 in addition to the sensor 420. For example, the first structure 201 may include a mechanical switch element, and the second structure 202 may include a recess or a protrusion that may be engaged or interfere with the mechanical switch element. It is possible to obtain the information about the state of the first structure 201 with respect to the second structure 202 by identifying the position of the recess or protrusion engaged with or interfering with the mechanical switch element included in the first structure 201 while the first structure 201 slides with respect to the second structure 202.

In an embodiment, the memory 430 may be identical to the memory 130 of FIG. 1. The memory may store various pieces of information related to the operation of the electronic device 101, and the various pieces of information stored in the memory 430 are described below in detail.

In an embodiment, the processor 440 may be identical to the processor 120 of FIG. 1. The processor 440 may control the overall operation of the electronic device 101, and the operation of the processor 440 is described below in detail.

Although FIG. 4 illustrates an example in which the electronic device 101 includes the display 410, the sensor 420, the memory 430, and the processor 440, it is not limited thereto. In an embodiment, the electronic device 101 may further include additional components other than the components shown in FIG. 4 or may not include some components. For example, the electronic device 101 may further include a communication module (e.g., the communication module 190 of FIG. 1, comprising communication circuitry) or may not include some of the components included in the above-described sensor 420.

Figure 5:
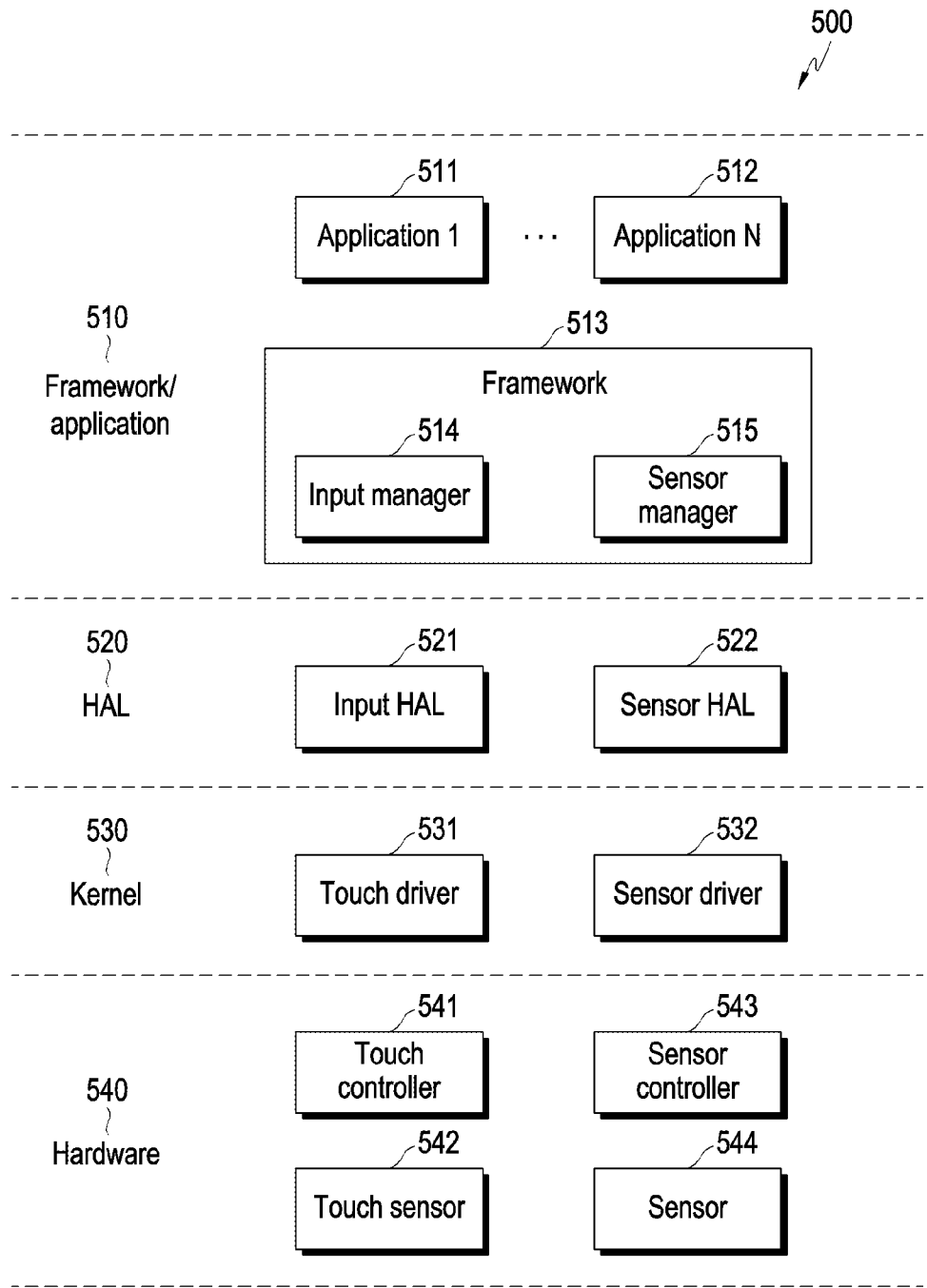
FIG. 5 is a view illustrating an operation method of an electronic device according to various example embodiments.

FIG. 5 is a view 500 illustrating an operation method of an electronic device 101 according to various embodiments. For example, FIG. 5 may be a logical block diagram for describing an operation logic of the electronic device 101.

Referring to FIG. 5, in an embodiment, the electronic device 101 may include a framework/application 510, a hardware abstraction layer (HAL) 520, a kernel 530, and hardware 540.

In an embodiment, the touch sensor 542 (e.g., a touch panel) may detect a touch by the user. In an embodiment, the touch sensor 542 may detect a hovering as well as the touch.

In an embodiment, the touch sensor 542 may obtain (e.g., generate) information about the state of the first structure 201 with respect to the second structure 202.

Since the touch sensor 542 has been described above in detail, a detailed description of the touch sensor 542 will be omitted.

In an embodiment, the touch controller 541 may control the operation of the touch sensor 542. For example, the touch controller 541 may control the touch sensor 542 to be driven based on a set driving frequency and driving timing.

In an embodiment, the touch controller 541 may obtain information about the touch or hovering from the touch sensor 542. In an embodiment, the touch controller 541 may obtain the information about the state of the first structure 201 with respect to the second structure 202 from the touch sensor 542.

In an embodiment, the touch controller 541 may obtain information about the position (coordinates) of the user's touch (or hovering) on the touch sensor 542, based on the including obtained from the touch sensor 542.

In an embodiment, the touch controller 541 may transfer at least one of the information about the position of the user's touch on the touch sensor 542 or the information about the state of the first structure 201 with respect to the second structure 202 to the touch driver 531.

In an embodiment, a combination of the touch sensor 542 and the touch controller 541 may be referred to as a touch sensor.

In an embodiment, the sensor 544 may represent a sensor capable of obtaining the information about the state of the first structure 201 with respect to the second structure 202, as exemplified through FIG. 4. For example, the sensor 544 may represent at least one of a hall sensor, an inertial sensor, an optical sensor, a pressure sensor, an illuminance sensor, or a mechanical switch element.

In an embodiment, the sensor controller 543 may control the operation of sensor 544. In an embodiment, the sensor controller 543 may obtain the information about the state of the first structure 201 with respect to the second structure 202 from the sensor 544.

In an embodiment, a combination of the sensor 544 and the sensor controller 543 may be referred to as a sensor.

In an embodiment, the touch driver 531 (also referred to as an 'input driver') may transfer the information obtained from the touch controller 541 to the input HAL 521.

In an embodiment, the touch driver 531 may distinguish between the touch input to the first portion (at least a portion of the portion of the display 410 visually exposed to the outside as the first structure 201 slides) in the display 410 and the touch input to the second portion (at least a portion of the portion of the display 410 received (or inserted) in the second structure 202) of the display.

In an embodiment, the touch driver 531 may transfer information (e.g., the position on the touch sensor 542 where the touch is inputted) about the touch input to the first portion of the display to the input HAL 521. In an embodiment, upon receiving the touch input to the second portion (e.g., the portion of the touch sensor 542 corresponding to the second portion of the display) of the display, the touch driver 531 may convert the received touch input into a touch input to the first portion of the display. For example, the touch driver 531 may convert the position (coordinates) of the touch to the second portion of the display into the position of the first portion of the display.

In an embodiment, when a cursor is displayed through the first portion of the display (e.g., when a cursor is displayed on the screen displayed through the first portion of the display), the touch driver 531 may convert the position of the touch to the second portion of the display into the position of the first portion of the display, based on the position of the cursor. Hereinafter, a scheme of converting the position of the touch to the second portion of the display into the position of the first portion of the display based on the position of the cursor is referred to as a 'first scheme.'

In an embodiment, the touch driver 531 may convert the position of the touch to the second portion of the display into the position of the first portion of the display corresponding to (e.g., mapped to) the position of the touch to the second portion of the display. Hereinafter, a scheme of converting the position of the touch to the second portion of the display into the position of the first portion of the display corresponding to the position of the touch to the second portion of the display is referred to as a 'second scheme.'

The above-described first scheme and second scheme are described below in detail with reference to FIGS. 8 and 9.

In an embodiment, the touch driver 531 may identify the portion touched by the user of the display 410, of the first portion of the display and the second portion of the display, based on the information about the state of the first structure 201 with respect to the second structure 202, obtained from the sensor (e.g., at least one of the touch sensor 542 or the sensor 544). For example, the touch driver 531 may obtain the information about the state of the first structure 201 with respect to the second structure 202 from the touch sensor 542. The touch driver 531 may obtain the information about the state of the first structure 201 with respect to the second structure 202, via the sensor controller 543, the sensor driver 532, the sensor HAL 522, the sensor manager 515, and the input HAL 521, from the sensor 544. The touch driver 531 may identify the first portion of the display and the second portion of the display, based on the information about the state of the first structure 201 with respect to the second structure 202, obtained from at least one of the touch sensor 542 or the sensor 544. The touch driver 531 may identify which one of the first portion of the display and the second portion of the display the position of the user's touch is included in based on the information about the position of the user's touch obtained from the touch sensor 542.

The operation of identifying the portion touched by the user of the display 410, of the first portion of the display and the second portion of the display, based on the information about the state of the first structure 201 with respect to the second structure 202, obtained from the sensor (e.g., at least one of the touch sensor 542 or the sensor 544) is described below in detail.

In an embodiment, when the second portion of the display is touched, the touch driver 531 may identify modes related to the input of the electronic device 101. In an embodiment, the modes related to the electronic device 101 may include a first mode in which the function of the electronic device 101 is performed based on the touch input to the second portion of the display (and the touch input to the first portion of the display) (hereinafter, referred to as a 'first mode') (also referred to as a 'touchpad mode') and a second mode in which the function of the electronic device 101 is performed based on the touch input to the first portion of the display, and the function of the electronic device 101 is not performed by the touch input to the second portion of the display (hereinafter, referred to as a 'second mode') (also referred to as a 'normal mode').

In an embodiment, when the electronic device 101 is in the first mode, the function of the electronic device 101 may be performed based on the touch input to the second portion of the display, other than the first portion of the display.

In an embodiment, when the electronic device 101 is in the second mode, the function of the electronic device 101 is performed by the touch input to the first portion of the display, but the touch input to the second portion of the display may be disregarded. However, without limitations thereto, in an embodiment, when the electronic device 101 is in the second mode, if a designated touch input (e.g., a touch input for entering into the first mode) to the second portion of the display is obtained, the function of the electronic device 101 (e.g., the operation of entering from the second mode to the first mode) may be performed based on the designated touch input.

In an embodiment, when the second portion of the display is touched in the first mode or second mode, the touch driver 531 may identify the mode in which the electronic device 101 is currently operating, of the first mode or the second mode.

In an embodiment, the touch driver 531 may change the obtained information (at least one of the information about the position of the user's touch on the touch sensor 542 or the information about the state of the first structure 201 with respect to the second structure 202) into an event form (e.g., format) and transfer the event form of information to the input manager 514 or the input HAL 521.

In an embodiment, if a touch to the second portion of the display 410 is input, the touch driver 531 may convert information about the input touch (e.g., the coordinates of the touch down to the second portion of the display 410 or the coordinates of the moved touch to the second portion of the display) into an event form of mouse information (e.g., information about the position of the cursor or information related to the movement of the cursor) (or also referred to as a 'mouse event') and transfer it to an application (e.g., at least one of application 1 511 to application N 512).

In an embodiment, the sensor driver 532 may change the information about the state of the first structure 201 with respect to the second structure 202, obtained from the sensor 544 (or the sensor controller 543) into an event form and transfer the event form of information to the sensor HAL 522.

In an embodiment, the input HAL 521 may transfer the information obtained from the touch driver 531 to the input manager 514. In an embodiment, the input HAL 521 may obtain the information about the state of the first structure 201 with respect to the second structure 202, via the sensor controller 543, the sensor driver 532, the sensor HAL 522, and the sensor manager 515, from the sensor 544 and transfer the obtained information about the state of the first structure 201 with respect to the second structure 202 to the touch driver 531.

In an embodiment, the sensor HAL 522 may obtain the information about the state of the first structure 201 with respect to the second structure 202, via the sensor controller 543 and the sensor driver 532 from the sensor 544 and transfer the obtained information about the state of the first structure 201 with respect to the second structure 202 to the sensor manager 515.

In an embodiment, the input manager 514 may perform the function of the electronic device 101 based on the information obtained from the touch driver 531 or the input HAL 521. For example, when obtaining information about the touch input to the second portion of the display (or touch input to the first portion of the display) from the touch driver 531, the input manager 514 may perform the function of the electronic device 101 corresponding to the touch input. In an embodiment, when the execution screen of the application (e.g., application 1 511 and application N 512) is displayed through the first portion of the display, the input manager 514 may perform the function related to the execution screen of the application, based on the touch input to the second portion of the display.

In an embodiment, the sensor manager 515 may perform the function of the electronic device 101 based on the information obtained from the sensor HAL 522. In an embodiment, the sensor manager 515 may be included in the framework 513.

In an embodiment, the electronic device 101 may include subdivided components of the components of FIG. 5 or may include integrated components of some of the components of FIG. 5.

In an embodiment, although each of the components included in the electronic device 101 has been described in connection with FIG. 5, the function performed by each of the components included in the electronic device 101 is not limited to the above-described example. For example, some of the functions performed by the touch driver 531 may be performed by the input manager 514 or the input HAL 521.

In an embodiment, at least some functions performed by at least one of the framework 513, the input HAL 521, the sensor HAL 522, the touch driver 531, the sensor driver 532, the touch controller 541, or the sensor controller 543 may be denoted as functions performed by the processor 440 (comprising processing circuitry).

According to various embodiments, an electronic device 101 may comprise a first structure 201, a second structure 202 guiding a slide of the first structure 201, a flexible display 410 at least partially received in an inside of the second structure 202 or visually exposed to an outside of the second structure 202 according to the slide of the first structure 201, at least one sensor 420, and at least one processor 440 functionally connected, directly or indirectly, with the flexible display 410 and the at least one sensor 420. The at least one processor 440 may be configured to obtain information about a state of the first structure 201 with respect to the second structure 202 through the at least one sensor 420, detect a touch input through the at least one sensor 420, identify a portion of the flexible display 410, where the touch input is detected, of a first portion visually exposed to the outside and a second portion received in the inside of the second structure 202 in the flexible display 410, based on the information about the state of the first structure 201 with respect to the second structure 202, and when the identified portion is the second portion, perform a function related to a screen displayed through the first portion, based on the touch input.

In various embodiments, the state of the first structure 201 with respect to the second structure 202 may be a state in which the first structure 201 is closed with respect to the second structure 202, a state in which the first structure 201 is opened with respect to the second structure 202, or an intermediate state between the closed state and the opened state.

In various embodiments, the at least one processor 440 may be configured to obtain the information about the first structure 201 with respect to the second structure 202 through at least one of a touch sensor, a hall sensor, an inertial sensor, a pressure sensor, an optical sensor, or an illuminance sensor.

In various embodiments, the at least one processor 440 may be configured to convert the touch input to the second portion into a touch input to the first portion, based on a position of a cursor displayed through the first portion.

In various embodiments, the at least one processor 440 may be configured to convert a position of a touch to the second portion into a position for the first portion corresponding to the position of the touch to the second portion.

In various embodiments, the at least one processor 440 may be configured to identify a mode of the electronic device 101 of a first mode of performing the function based on a touch input to the second portion and a second mode of not performing the function based on the touch input to the second portion and, when the mode of the electronic device 101 is the first mode, and the identified portion is the second portion, perform the function related to the screen displayed through the first portion, based on the touch input.

In various embodiments, the at least one processor 440 may be configured to detect a touch input to the second portion set to switch the second mode to the first mode while the electronic device 101 operates in the second mode and switch the second mode to the first mode based on the touch input to the second portion.

In various embodiments, the at least one processor 440 may be configured to set the function corresponding to the touch input to the second portion based on a user input.

In various embodiments, the at least one processor 440 may be configured to detect a hovering input to a portion where the flexible display 410 is not disposed in the second structure 202 through the at least one sensor 420 and perform the function related to the screen displayed through the first portion, based on the hovering input.

In various embodiments, the at least one processor 440 may be configured to detect a touch input to a curved portion with respect to a rotational axis of a roller of the electronic device 101 in the second portion, through the at least one sensor 420 and perform the function related to the screen displayed through the first portion, based on the touch input to the curved portion.

Figure 6:
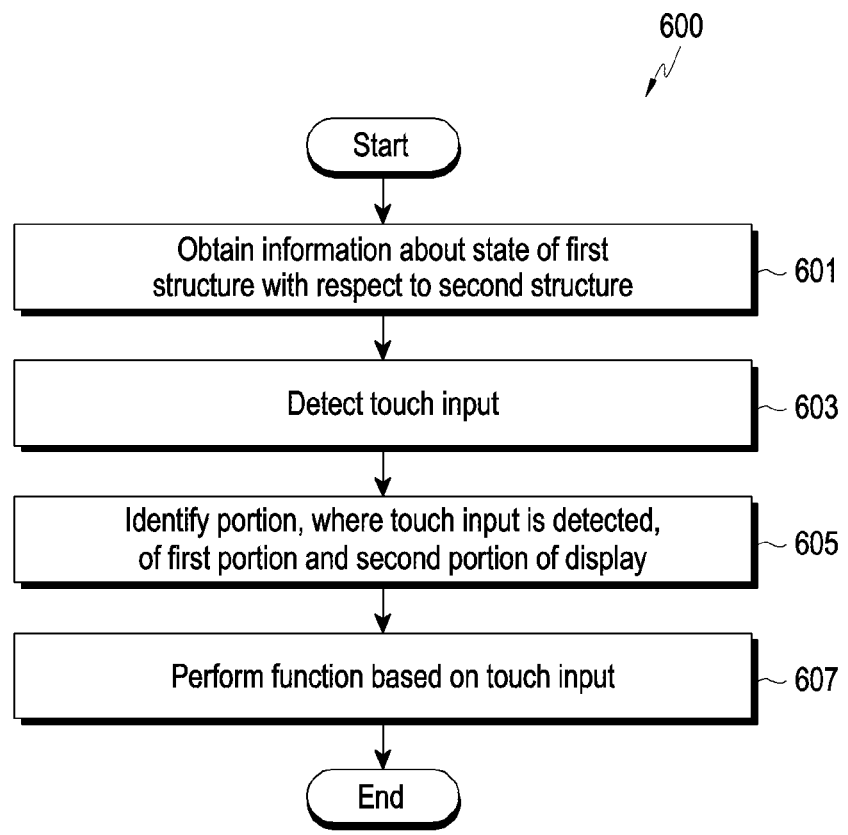
FIG. 6 is a flowchart illustrating an operation method of an electronic device according to various example embodiments.

FIG. 6 is a flowchart 600 illustrating an operation method of an electronic device 101 according to various embodiments.

Referring to FIG. 6, in operation 601, in an embodiment, the processor 440 may obtain information about the state of the first structure 201 with respect to the second structure 202 through a sensor.

In an embodiment, the processor 440 may obtain the information about the state of the first structure 201 with respect to the second structure 202, through at least one of the touch sensor or the pressure sensor included in the display 410.

In an embodiment, the processor 440 may obtain the information about the state of the first structure 201 with respect to the second structure 202, through at least one of a hall sensor, an inertial sensor, an optical sensor, an illuminance sensor, or a mechanical switch element.

In an embodiment, the state of the first structure 201 with respect to the second structure 202 may include a state in which the first structure 201 is opened with respect to the second structure 202, a state in which the first structure 201 is opened with respect to the second structure 202, and an intermediate state between the closed state and the opened state. The state of the first structure 201 with respect to the second structure 202 is described below in detail with reference to FIG. 7.

Figure 7:
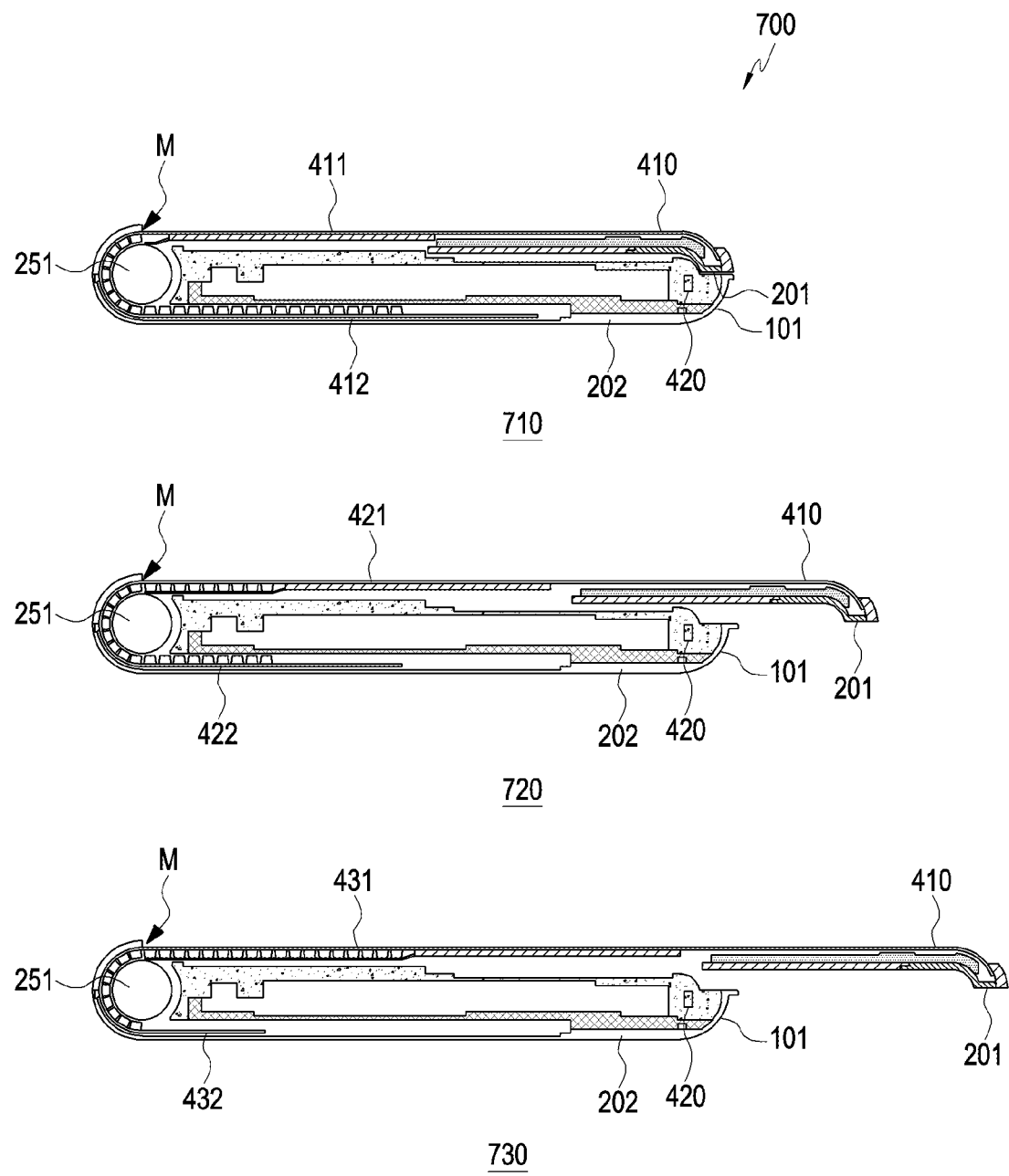
FIG. 7 is an example view illustrating a state of a first structure with respect to a second structure according to a slide of the first structure according to various example embodiments.

FIG. 7 is an example view 700 illustrating a state of a first structure 201 with respect to a second structure 202 according to a slide of the first structure 201 according to various embodiments.

Referring to FIG. 7, in an embodiment, reference number 710 may denote the electronic device 101 which is in a state in which the first structure 201 is closed with respect to the second structure 202. In an embodiment, the state in which the first structure 201 is closed with respect to the second structure 202 may be a state in which the first structure 201 is received in the second structure 202 to the maximum or a large extent (e.g., no longer receivable).

In an embodiment, at reference number 710, the portion 411 of the display 410 visually exposed to the outside with respect to point M (or line) may be the first portion of the display, and the portion 412 of the display 410 not visually exposed to the outside may be the second portion of the display. In an embodiment, the second portion of the display may be a portion of the display 410 received (or inserted) in the second structure 202.

In an embodiment, reference number 720 may denote the electronic device 101 which is in an intermediate state of the first structure 201 with respect to the second structure 202.

In an embodiment, as the first structure 201 slides with respect to the second structure 202, the display 410 may be slid. As the display 410 slides, the portion visually exposed to the outside may be changed.

In an embodiment, at reference number 720, the portion 421 of the display 410 visually exposed to the outside with respect to point M may be the first portion of the display, and the portion 422 of the display 410 not visually exposed to the outside may be the second portion of the display.

In an embodiment, reference number 720 denotes an example of the intermediate state of the first structure 201 with respect to the second structure 202. the first portion of the display (e.g., the area of the display 410 visually exposed to the outside) and the second portion of the display (e.g., the area of the display 410 not visually exposed to the outside) may vary depending on the degree to which the first structure 201 slides with respect to the second structure 202 (e.g., the sliding distance).

In an embodiment, reference number 730 may denote the electronic device 101 which is in a state of the first structure 201 is opened with respect to the second structure 202. In an embodiment, the state in which the first structure 201 is opened with respect to the second structure 202 may be a state in which the first structure 201 is opened in the second structure 202 to the maximum or to a large extent (e.g., no longer openable).

In an embodiment, at reference number 730, the portion 431 of the display 410 visually exposed to the outside with respect to point M may be the first portion of the display, and the portion 432 of the display 410 not visually exposed to the outside may be the second portion of the display.

In an embodiment, the processor 440 may obtain the information about the state of the first structure 201 with respect to the second structure 202 through the sensor 420 while displaying the screen through the first portion of the display. For example, the processor 440 may display the execution screen of the application through the first portion of the display. The processor 440 may obtain the information about the state of the first structure 201 with respect to the second structure 202, through the sensor 420 while displaying the execution screen of the application through the first portion of the display.

In an embodiment, the processor 440 (comprising processing circuitry) may obtain the information about the state of the display 410 with respect to the second structure 202 through the sensor 420 while displaying the screen through the first portion of the display. For example, the processor 440 may obtain information about the sliding state (e.g., whether it slides, the sliding degree, and/or sliding distance) of the display 410 with respect to the second structure 202, through the sensor 420. In an embodiment, the information about the state of the first structure 201 with respect to the second structure 202 may include information about the state of the display 410 with respect to the second structure 202.

In an embodiment, upon obtaining the information about the state of the first structure 201 with respect to the second structure 202 while displaying the screen through the first portion of the display, the processor 440 may change the screen displayed through the first portion of the display. For example, the processor 440 may display a home screen including N icons through the first portion of the display in the closed state of the first structure 201 with respect to the second structure 202. When switching from the closed state of the first structure 201 with respect to the second structure 202 to the intermediate state, the processor 440 may display the home screen including N or more icons through the first portion of the display corresponding to the intermediate state (e.g., the portion 421 of the display 410 denoted by reference number 720). However, the example of changing the screen displayed through the first portion of the display upon obtaining the information about the state of the first structure 201 with respect to the second structure 202 while displaying the screen through the first portion of the display is not limited to the above-described example.

Referring back to FIG. 6, in operation 603, in an embodiment, the processor 440 may detect a touch input through the sensor 420 (e.g., see FIGS. 6-7).

In an embodiment, the processor 440 may detect the touch input through the touch sensor. For example, the processor 440 may detect a touch to at least one of the first portion of the display or the second portion of the display through the touch sensor included in the display 410. The processor 440 may identify the position (coordinates) of the touch to at least one of the first portion of the display or the second portion of the display, based on the detected touch.

In an embodiment, the touch to the second portion of the display may include a touch to the rear surface (e.g., the second plate 221a (e.g., rear case) or the rear plate 221b (e.g., rear window)) of the electronic device 101.

In an embodiment, the touch to the first portion of the display may include a touch to the front surface of the electronic device 101.

Although FIG. 6 illustrates that the processor 440 performs operation 603 after operation 601, example embodiments are not limited thereto. For example, the processor 440 may perform operation 601 after operation 603.

In operation 605, in an embodiment, the processor 440 may identify the portion where the touch input is detected, of the first portion of the display and the second portion of the display, based on the information about the state of the first structure 201 with respect to the second structure 202.

In an embodiment, the processor 440 may identify which one of the first portion of the display and the second portion of the display is the position of the touch on the display 410 based on the information about the state of the first structure

201 with respect to the second structure 202, obtained through the examples of operation 601.

In an embodiment, the processor 440 may identify the first portion of the display and the second portion of the display based on the information about the state of the first structure 201 with respect to the second structure 202. The processor 440 may identify which one of the first portion of the display and second portion of the display identified the position of the touch on the display 410 is included in.

In operation 607, in an embodiment, when the portion where the touch input is detected is the second portion of the display, the processor 440 may perform the function related to the screen displayed through the first portion of the display.

In an embodiment, upon receiving a touch input to the second portion of the display, the processor 440 may convert the received touch input to the second portion of the display into a touch input to the first portion of the display. For example, the processor 440 may convert the position (coordinates) of the touch to the second portion of the display into the position of the first portion of the display.

In an embodiment, upon receiving a touch input to the second portion of the display, the processor 440 may convert the received touch input into a touch input to the first portion of the display, using the first scheme. A method for converting the touch input to the second portion of the display into the touch input to the first portion of the display using the first scheme is described below in detail with reference to FIG. 8.

Figure 8:
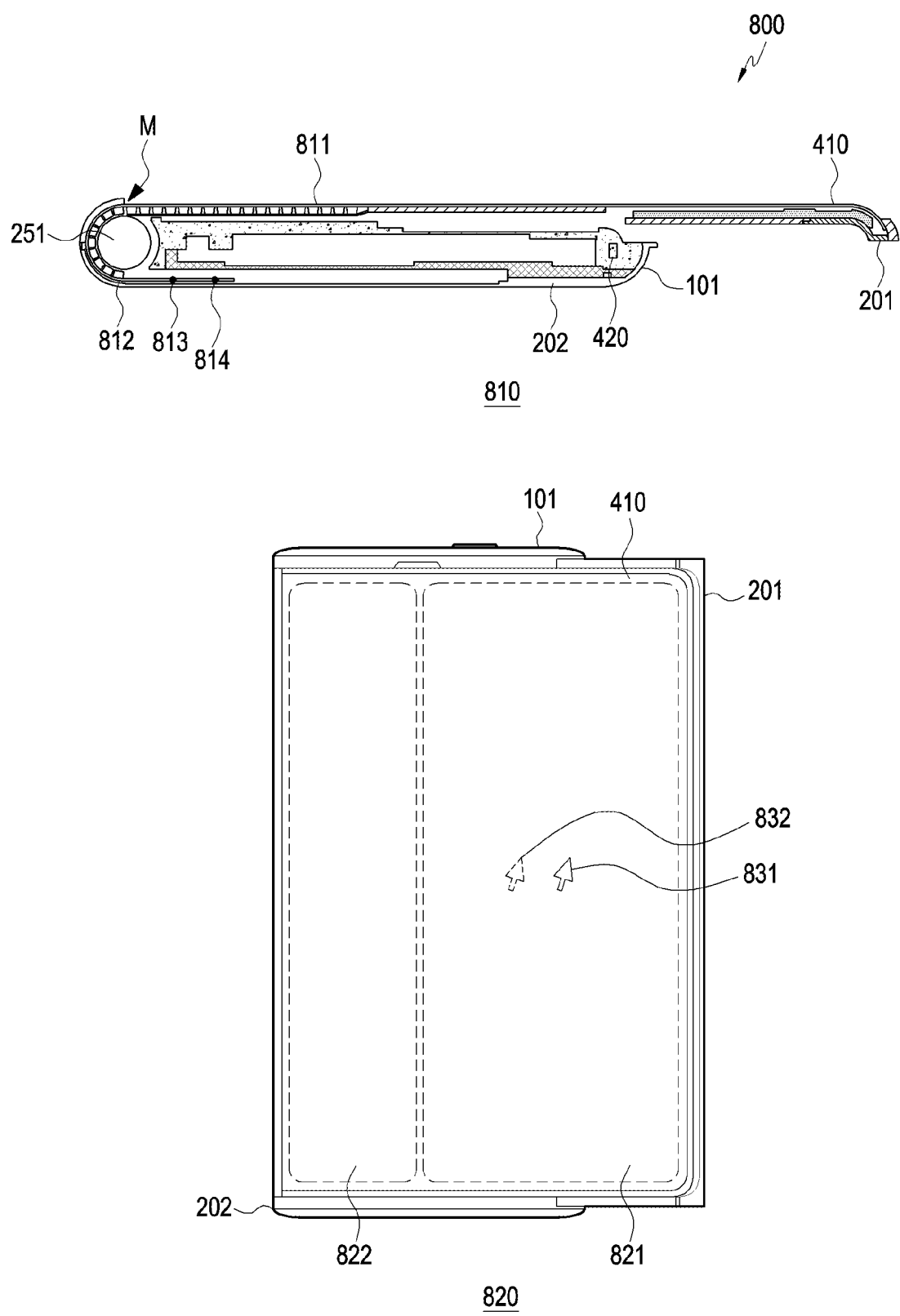
FIG. 8 is an example view illustrating a method for performing a function related to a screen displayed on a first portion of a display based on input to a second portion of the display by a first scheme according to various example embodiments.

FIG. 8 is an example view 800 illustrating a method for converting touch input to a second portion of a display into touch input to a first portion of the display by a first scheme according to various embodiments.

Referring to FIG. 8, in an embodiment, reference number 810 may denote the opened state of the first structure 201 with respect to the second structure 202. However, the following examples may be identically or similarly applied to the intermediate state of the first structure 201 with respect to the second structure 202 or the closed state of the first structure 201 with respect to the second structure 202, other than the opened state of the first structure 201 with respect to the second structure 202.

In an embodiment, at reference number 810, the portion 811 of the display 410 visually exposed to the outside with respect to point M may be the first portion of the display, and the portion 812 of the display 410 not visually exposed to the outside may be the second portion of the display.

In an embodiment, at reference number 820, in the opened state of the first structure 201 with respect to the second structure 202, the processor 440 may display a cursor 831 through the first portion of the display. In an embodiment, the processor 440 may display the cursor 831 through the first portion of the display while the electronic device 101 operates in the first mode. For example, the processor 440 may not display the cursor 831 through the first portion of the display while the electronic device 101 operates in the second mode. The processor 440 may display the cursor 831 through the first portion of the display when the mode of the electronic device 101 switches from the second mode to the first mode. However, example embodiments are not limited thereto. For example, in both the first mode and the second mode, the processor 440 may display the cursor 831 through the first portion of the display. In an embodiment, at reference number 820, reference number 821 may denote the portion of the display 410 visually exposed to the outside in the closed state of the first structure 201 with respect to the second structure 202, and reference number 822 may denote the portion of the display 410 visually exposed to the outside according to a switch from the closed state of the first structure 201 with respect to the second structure 202 to the opened state of the first structure 201 with respect to the second structure 202 without being visually exposed to the outside.

In an embodiment, the processor 440 may convert the touch input to the second portion of the display to an input to the cursor 831 displayed on the first portion of the display. For example, the processor 440 may convert the touch input to the position 814 on the second portion of the display into a touch input to the position of the cursor 831 on the first portion of the display.

In an embodiment, upon obtaining a moving touch input (e.g., drag input) on the second portion of the display, the processor 440 may convert the touch input to the second portion of the display into a touch input to the first portion of the display so that the touch input to the first portion of the display (e.g., touch input to the first portion of the display into which the touch input to the second portion of the display has been converted) is moved in the same direction as the moving direction of the touch input to the second portion of the display with respect to the rotational axis of the roller 251. For example, the processor 440 may convert the drag input from the position 814 to position 813 on the second portion of the display into a drag input to the position of the cursor 832 from the position of the cursor 831 on the first portion of the display. As another example, when a drag from the position 814 to the position 813 is input, the processor 440 may move the position of the cursor 831 on the first portion of the display to the position of the cursor 832 in the same direction as the direction from the position 814 to the position 813 in which the drag input is moved with respect to the rotational axis of the roller 251.

In an embodiment, upon obtaining a moving touch input (e.g., drag input) on the second portion of the display, the processor 440 may convert the touch input to the second portion of the display into a touch input to the first portion of the display so that the touch input to the first portion of the display (e.g., touch input to the first portion of the display into which the touch input to the second portion of the display has been converted) is moved by the same moving distance as the moving distance of the touch input to the second portion of the display. For example, when a drag from the position 814 to the position 813 is input, the processor 440 may move the position of the cursor 831 on the first portion of the display to the position of the cursor 832 by the same moving distance as the moving distance from the position 814 to the position 813 in which the drag input is moved.

In an embodiment, upon obtaining a moving touch input (e.g., drag input) on the second portion of the display, the processor 440 may convert the touch input to the second portion of the display into a touch input to the first portion of the display so that the touch input to the first portion of the display (e.g., touch input to the first portion of the display into which the touch input to the second portion of the display has been converted) is moved by a moving distance different from the moving distance of the touch input to the second portion of the display. For example, when the drag from the position 814 to the position 813 is input, the processor 440 may move the position of the cursor 831 on the first portion of the display to the position of the cursor 832 by a moving distance longer than the moving distance from the position 814 to the position 813 in which the drag input is moved (e.g., by scaling the moving distance of the touch to the second portion of the display or by multiplying the moving distance of the touch to the second portion of the display by a designated rate).

Referring back to FIG. 6, in an embodiment, upon receiving a touch input to the second portion of the display, the processor 440 may convert the received touch input into a touch input to the first portion of the display, using the second scheme. A method for converting the touch input to the second portion of the display into the touch input to the first portion of the display using the second scheme is described below in detail with reference to FIG. 9.

Figure 9:
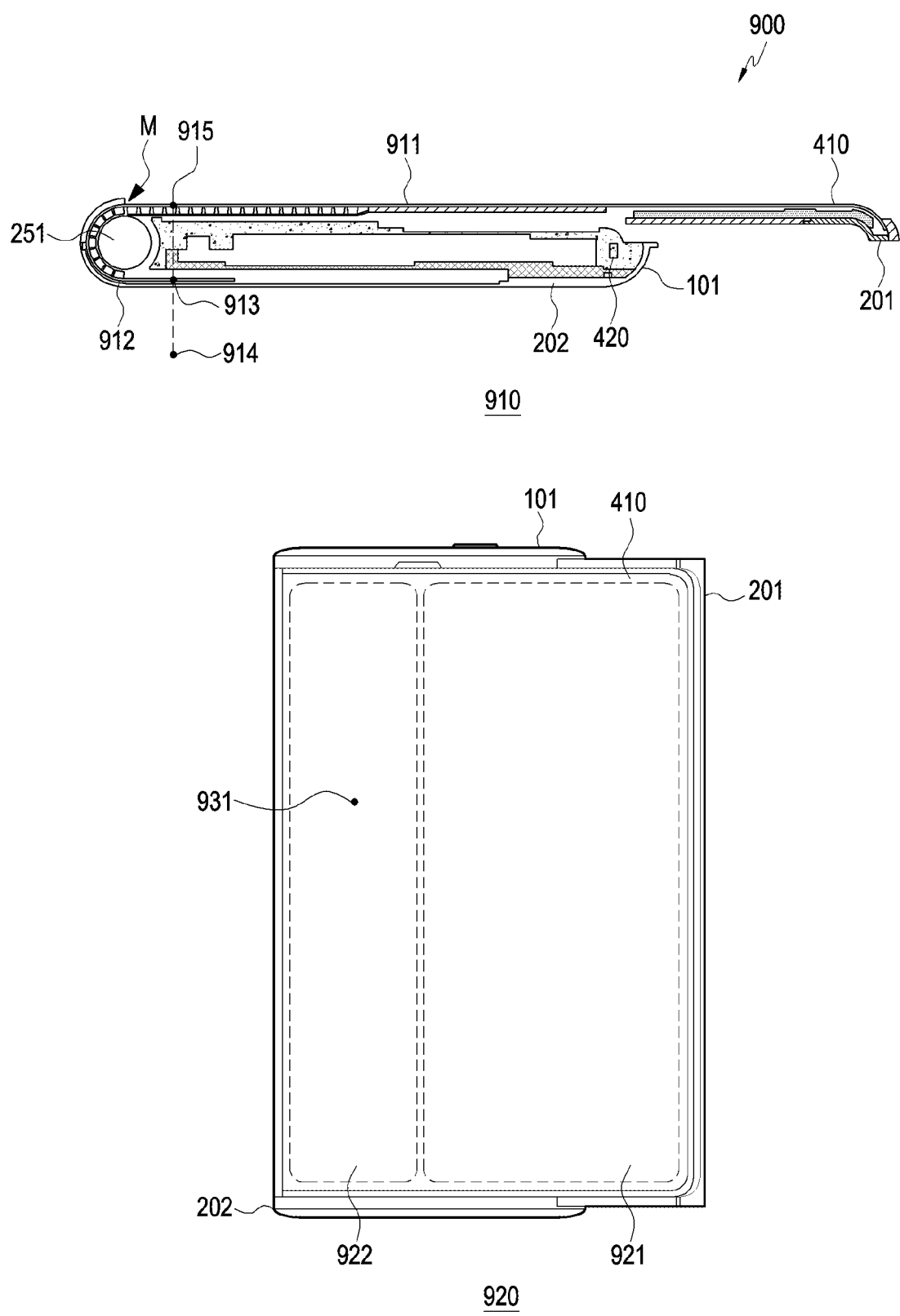
FIG. 9 is an example view illustrating a method for converting touch input to a second portion of a display into touch input to a first portion of the display by a second scheme according to various example embodiments.

FIG. 9 is an example view 900 illustrating a method for converting touch input to a second portion of a display into touch input to a first portion of the display by a second scheme according to various embodiments.

Referring to FIG. 9, in an embodiment, reference number 910 may denote the opened state of the first structure 201 with respect to the second structure 202. However, the following examples may be identically or similarly applied to the intermediate state of the first structure 201 with respect to the second structure 202 or the closed state of the first structure 201 with respect to the second structure 202, other than the opened state of the first structure 201 with respect to the second structure 202.

In an embodiment, at reference number 910, the portion 911 of the display 410 visually exposed to the outside with respect to point M may be the first portion of the display, and the portion 912 of the display 410 not visually exposed to the outside may be the second portion of the display.

In an embodiment, at reference number 920, reference number 921 may denote the portion of the display 410 visually exposed to the outside in the closed state of the first structure 201 with respect to the second structure 202, and reference number 922 may denote the portion of the display 410 visually exposed to the outside according to a switch from the closed state of the first structure 201 with respect to the second structure 202 to the opened state of the first structure 201 with respect to the second structure 202 without being visually exposed to the outside.

In an embodiment, the processor 440 may convert the position of the touch to the second portion of the display into the position of the first portion of the display corresponding to (e.g., mapped to) the position of the touch to the second portion of the display. For example, the processor 440 may convert the position 913 of the touch to the second portion of the display into the position 915 of the first portion of the display corresponding to the position 913.

In an embodiment, when a hovering input to the second portion of the display is obtained (e.g., inputted), the processor 440 may display an object related to the position of the hovering input to the second portion of the display, in the position of the first portion of the display, corresponding to the position of the hovering input on the second portion of the display, through the first portion of the display. For example, when a hovering input is obtained in the position 914 spaced apart from the first portion of the display, the processor 440 may display a floating object 931 indicating the position 914 of the hovering input, as shown by reference number 920, in the position 915 of the display 410, corresponding to the position 914 of the hovering input on the second portion of the display (or the position 913 of the second portion of the display corresponding (e.g., perpendicular) to the position 914).

In an embodiment, in a manner identical or similar to the first scheme, using the second scheme, upon obtaining a moving touch input (e.g., drag input) on the second portion of the display, the processor 440 may convert the touch input to the second portion of the display into a touch input to the first portion of the display so that the touch input to the first portion of the display (e.g., touch input to the first portion of the display into which the touch input to the second portion of the display has been converted) is moved in the same direction as the moving direction of the touch input to the second portion of the display with respect to the rotational axis of the roller 251.

Although not shown in FIG. 9, the processor 440 may display a cursor in the position of the first portion of the display corresponding to (mapped to) the position of the touch to the second portion of the display, upon obtaining the touch input (e.g., touch down input) to the second portion of the display after the hovering input to the second portion of the display (e.g., continuously to the hovering input). For example, when a touch input to the position 913 of the second portion of the display is obtained after a hovering input is obtained in the position 914 spaced apart from the second portion of the display, the processor 440 may display a cursor in the position 915 of the first portion of the display corresponding to the position 913 of the second portion of the display. However, without limitations thereto, the processor 440 may display a cursor in the position of the first portion of the display corresponding to the position of the touch input to the second portion of the display or the position of the hovering input to the second portion of the display while obtaining the touch input to the second portion of the display or the hovering input to the second portion of the display, as an example.

Referring back to FIG. 6, in an embodiment, the processor 440 may select the first scheme or the second scheme based on a user input. For example, the processor 440 may convert the touch input to the second portion of the display into the touch input to the first portion of the display using the scheme selected by the user of the first scheme and the second scheme.

In an embodiment, when the touch input to the second portion of the display is converted into the touch input to the first portion of the display, the processor 440 may perform the function related to the screen displayed through the first portion of the display, corresponding to the converted touch input to the first portion of the display. For example, upon detecting a touch input (e.g., single tap input) to the second portion of the display while at least a portion of the icon overlaps at least a portion of the cursor on the screen displayed through the first portion of the display, the processor 440 may execute the application corresponding to the icon. However, the method for performing the function related to the screen displayed through the first portion of the display based on a touch input to the second portion of the display is not limited to the above-described example. In an embodiment, the processor 440 may set the touch input to the second portion of the display and the function corresponding to the touch input to the second portion of the display based on a user input. For example, the processor 440 may set the touch input to the second portion of the display and the function corresponding to the touch input to the second portion of the display based on a user input as shown in Table 1 below.

TABLE 1

| Touch input to the second portion of the display | Function |
|---|---|
| tap | execute function (e.g., execute the application corresponding to the icon) |
| tap and drag | move object |
| double tap and long press | select object |
| double tap and long press and drag | scroll screen |
| double tap | enter into first mode |

However, the example of setting the touch input to the second portion of the display and the function corresponding to the touch input to the second portion of the display based on a user input is not limited to Table 1. In an embodiment, when a gesture to the first portion of the display is set to perform the first function of the electronic device 101, the processor 440 may set the same gesture as the gesture set to the first portion of the display, for the second portion of the display to perform the first function of the electronic device 101. For example, when a swipe on the first portion of the display is set to perform a screen scroll function, the processor 440 may set a swipe on the second portion of the display to perform the screen scroll function.

In an embodiment, when the portion where the touch input is detected is the second portion of the display, the processor 440 may identify the current mode in which the electronic device 101 operates, of the first mode and the second mode. However, without limitations thereto, the processor 440 may identify the current mode in which the electronic device 101 operates, of the first mode and the second mode before obtaining the information about the state of the first structure 201 with respect to the second structure 202 in operation 601 or after detecting the touch input in operation 603.

In an embodiment, when the portion where the touch input is detected while the electronic device 101 operates in the first mode is the second portion of the display, the processor 440 may perform the function related to the screen displayed through the first portion of the display based on a touch input.

in an embodiment, when the portion where the touch input is detected while the electronic device 101 operates in the second mode is the second portion of the display, the processor 440 may not perform the function related to the screen displayed through the first portion of the display.

The first mode and second mode of the electronic device 101 are described below in detail with reference to FIG. 11.

Although not shown in FIG. 6, in an embodiment, when the portion where the touch input is detected is the first portion of the display, the processor 440 may perform the function based on the touch input.

Figure 10:
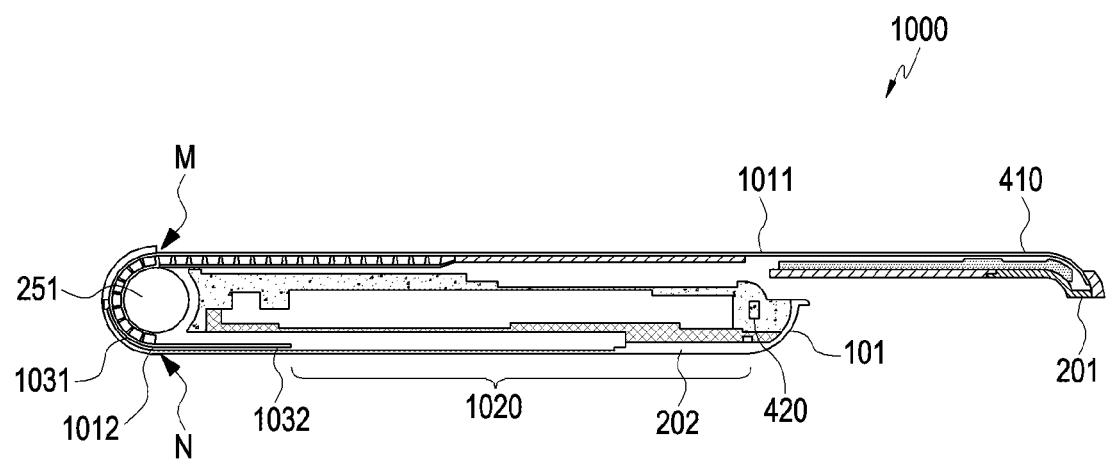
FIG. 10 is an example view illustrating a method for performing a function related to a screen displayed on a first portion of a display based on input to a second portion of the display according to various example embodiments.

FIG. 10 is an example view 1000 illustrating a method for performing a function related to a screen displayed on a first portion of a display based on input to a second portion of the display according to various embodiments.

Referring to FIG. 10, in an embodiment, FIG. 10 may denote the electronic device 101 which is in a state in which the first structure 201 is opened with respect to the second structure 202. In an embodiment, the state in which the first structure 201 is opened with respect to the second structure 202 may be a state in which the first structure 201 is opened in the second structure 202 to the maximum or to a large extent (e.g., no longer openable).

In an embodiment, in FIG. 10, the portion 1011 of the display 410 visually exposed to the outside with respect to point M may be the first portion of the display, and the portion 1012 of the display 410 not visually exposed to the outside may be the second portion of the display.

In an embodiment, the second portion of the display may include a curved portion 1031 (e.g., the display portion from point M to point N) with respect to the roller 251 and a flat portion 1032.

In an embodiment, the processor 440 may set (e.g., match (or map)) different functions of the electronic device 101 to the curved portion 1031 with respect to the roller 251 and the flat portion 1032.

In an embodiment, in the first mode, upon obtaining a drag input to the curved portion 1031 with respect to the roller in the second portion of the display, the processor 440 may increase or decrease the volume output through the electronic device 101.

In an embodiment, in the first mode, upon obtaining a drag input to the flat portion 1032 in the second portion of the display, the processor 440 may scroll the screen displayed through the first portion of the display.

However, the functions set to the curved portion 1031 with respect to the roller 251 and the flat portion 1032 in the second portion of the display while operating in the first mode by the processor 440 are not limited to the above-described example. In an embodiment, the processor 440 may set (e.g., match (or map)) the same functions of the electronic device 101 to the curved portion 1031 with respect to the roller 251 and the flat portion 1032. In an embodiment, the processor may switch screens (e.g., switch from a first menu screen to a second menu screen) or scroll the screen displayed through the first portion of the display, based on a touch input (e.g., drag input) to the curved portion 1031 with respect to the roller 251.

In an embodiment, the processor 440 may perform the function of the screen displayed through the first portion of the display, based on an input to a portion where the display 410 is not disposed (e.g., the portion where the display 410 is not disposed as the first structure 201 slides with respect to the second structure 202) in the rear surface of the electronic device 101 (e.g., the second plate 221a (e.g., rear case) or the rear plate 221b (e.g., rear window)). For example, in FIG. 10, the processor 440 may obtain a hovering input over the portion 1020 where the display 410 is not disposed (e.g., a position spaced apart by a designated distance from the portion 1020 where the display 410 is not disposed in the second structure 202). The processor 440 may perform the function of the screen displayed through the first portion of the display, based on the obtained hovering input.

Figure 11:
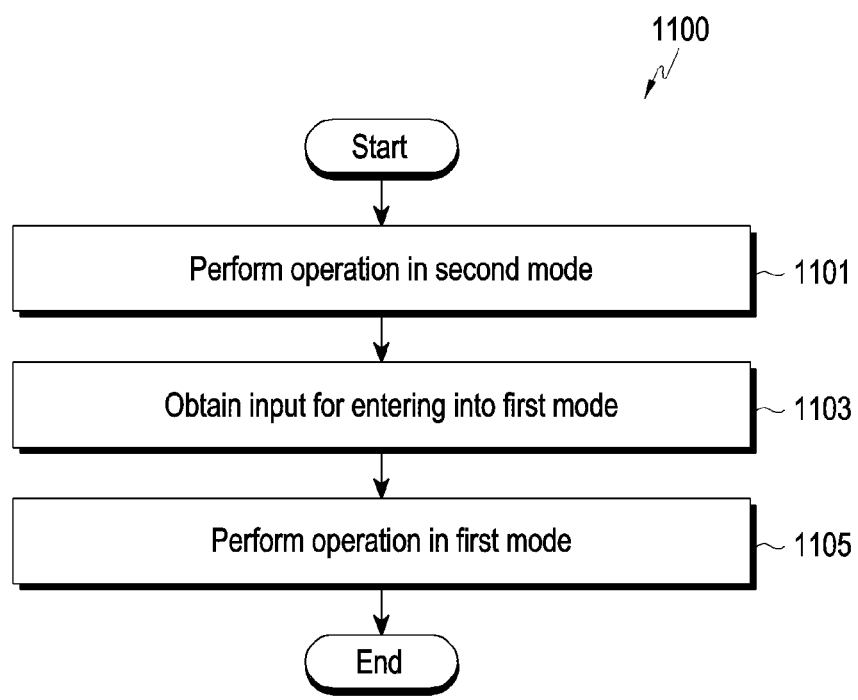
FIG. 11 is a flowchart illustrating a method for operating an electronic device in a first mode or a second mode according to various example embodiments.

FIG. 11 is a flowchart 1100 illustrating a method for operating an electronic device 101 in a first mode or a second mode according to various embodiments.

Referring to FIG. 11, in operation 1101, in an embodiment, the processor 440 may perform an operation in the second mode.

In an embodiment, the processor 440 may perform the function of the electronic device 101 based on a touch input to the first portion of the display. For example, the processor 440 may perform the function related to the screen displayed through the first portion of the display.

In an embodiment, the processor 440 may disregard a touch input to the second portion of the display while operating in the second mode. In an embodiment, the processor 440 may disregard touch input to the second portion of the display except for the input for switching the mode of the electronic device 101 from the second mode to the first mode while operating in the second mode.

In operation 1103, in an embodiment, the processor 440 may obtain an input for entering into the first mode.

In an embodiment, the processor 440 may switch the mode of the electronic device 101 from the second mode to the first mode based on a designated touch input to switch from the second mode to the first mode. For example, upon obtaining a designated touch input (e.g., double tap) to switch the second mode to the first mode through the second portion of the display (e.g., the portion of the touch sensor corresponding to the second portion of the display), the processor 440 may switch the mode of the electronic device 101 from the second mode to the first mode. As another example, the processor 440 may switch the mode of the electronic device 101 from the second mode to the first mode based on a touch input to an object (e.g., icon) which is displayed through the first portion of the display and in which a function for switching the second mode to the first mode is set. As another example, the processor 440 may switch the mode of the electronic device 101 from the second mode to the first mode based on an input to a physical key of the electronic device 101. However, the method for switching the mode of the electronic device 101 from the second mode to the first mode is not limited to the above-described example.

In operation 1105, in an embodiment, the processor 440 may perform operation in the first mode. For example, in operation 1103, upon obtaining an input for entering into the first mode, the processor 440 may enter into the first mode and perform operation in the first mode.

In an embodiment, the processor 440 may perform the function of the electronic device 101 based on a touch input to the second portion of the display (and touch input to the first portion of the display) while operating in the first mode. For example, the processor 440 may perform the function related to the screen displayed through the first portion of the display based on the touch input to the second portion of the display. As another example, the processor 440 may perform the function related to the screen displayed through the first portion of the display, based on the touch input to the first portion of the display.

In an embodiment, the processor 440 may set different sensitivities to portions in the touch sensor while operating in the first mode. For example, the processor 440 may set the sensitivity of the touch input detected by the portion of the touch sensor corresponding to the first portion of the display to be higher (or more sensitive) than the sensitivity of the touch input detected by the portion of the touch sensor corresponding to the first portion of the display while operating in the first mode.

Although not shown in FIG. 11, in an embodiment, the processor 440 may switch the mode of the electronic device 101 from the first mode to the second mode based on an input for switching the mode of the electronic device 101 from the first mode to the second mode. For example, upon obtaining a touch input to the second portion of the display, the processor 440 may release the first mode and switch the mode of the electronic device 101 from the first mode to the second mode. As another example, the processor 440 may switch the mode of the electronic device 101 from the first mode to the second mode based on a touch input to an object (e.g., icon) which is displayed through the first portion of the display and in which a function for switching the first mode to the second mode is set. As another example, the processor 440 may switch the mode of the electronic device 101 from the first mode to the second mode based on an input to a physical key of the electronic device 101.

Although not shown in FIG. 11, in an embodiment, the processor 440 may set different driving frequencies (e.g., scan frequencies) for obtaining a touch input by a portion of the touch sensor included in the second portion of the display (e.g., the area of the touch sensor corresponding to the area of the second portion of the display) in the first mode and the second mode. For example, the processor 440 may set the driving frequency for obtaining a touch input by the portion of the touch sensor included in the second portion of the display in the first mode to be higher than that in the second mode.

Figure 12:
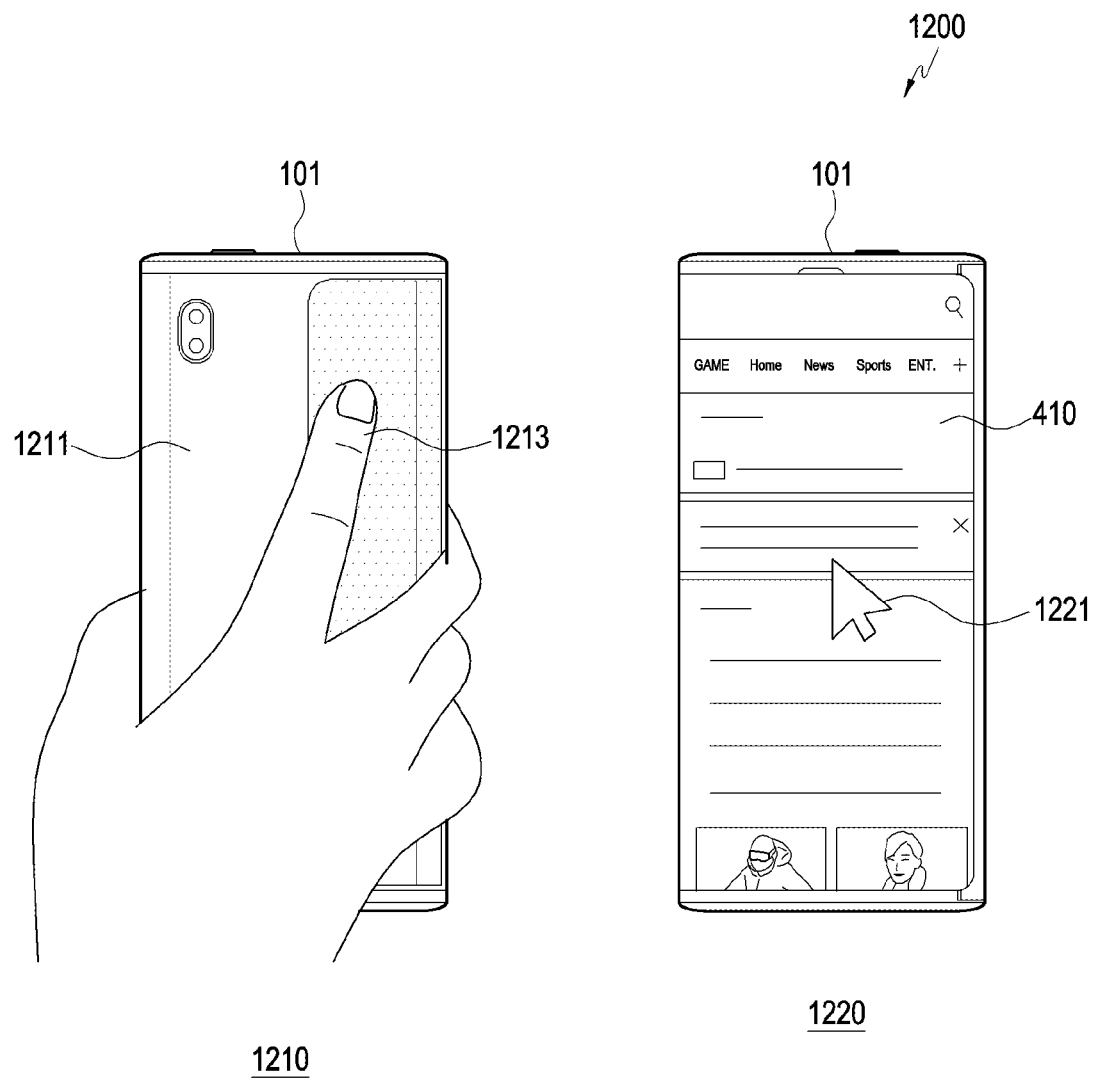
FIG. 12 is an example view illustrating an operation method of an electronic device according to various example embodiments.

FIG. 12 is an example view 1200 illustrating an operation method of an electronic device 101 according to various embodiments.

Referring to FIG. 12, in an embodiment, as shown by reference number 1210, the processor 440 may obtain an input to the rear surface 1211 (e.g., the second plate 221*a* (e.g., rear case) or the rear plate 221*b* (e.g., rear window)) of the electronic device 101 from the user (e.g., the user's finger 1213) through the sensor 420. For example, the processor 440 may obtain a touch input (e.g., touch down input or drag input) to the rear surface 1211 of the electronic device 101 through the touch sensor 542 (e.g., see FIG. 5).

In an embodiment, upon obtaining a touch input to the rear surface 1211 of the electronic device 101, the processor 440 ma perform the function of the electronic device 101 using a cursor 1221 (also referred to as a 'mouse point') displayed through the first portion of the display 410. For example, upon obtaining a touch down input (e.g., tap input) to the rear surface 1211 of the electronic device 101 in a state in which the cursor 1221 is positioned over an object (e.g., an icon mapped with a function), the processor 440 may perform the function mapped to the object (e.g., execute the application corresponding to the object). As another example, upon obtaining a drag input to the rear surface 1211 to the electronic device 101, the processor 440 may move the cursor 1221 (e.g., by the dragged distance or by a scaled distance of the dragged distance).

In an embodiment, reference number 1210 and reference number 1220 of FIG. 12 exemplify performing the function of the electronic device 101 based on a touch to the rear surface 1211 of the electronic device 101 while the electronic device 101 is in the closed state, but is not limited thereto. For example, the function of the electronic device may be performed based on a touch to the rear surface 1211 of the electronic device while the electronic device 101 is in the opened state or intermediate state.

Figure 13:
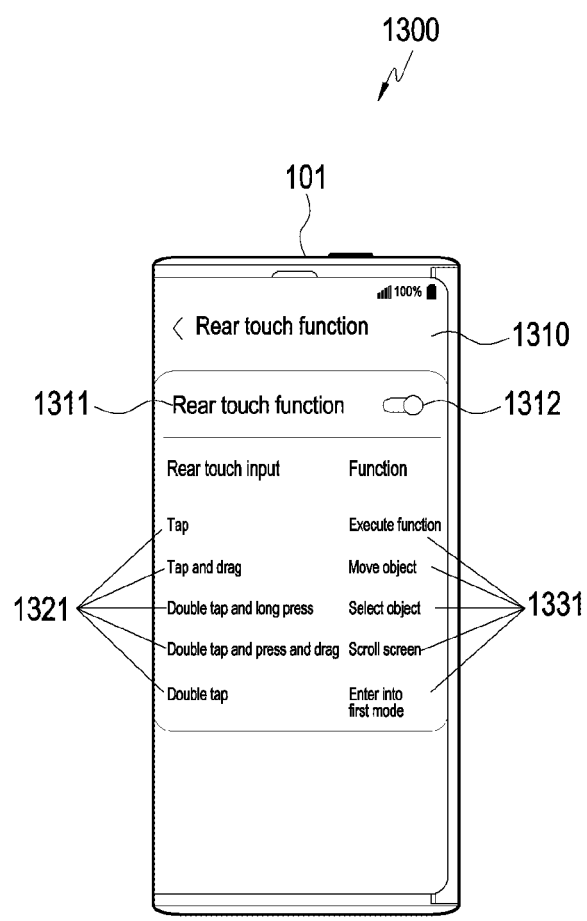
FIG. 13 is an example view illustrating a method for setting a function executed based on a touch to a rear surface of an electronic device according to various example embodiments.

FIG. 13 is an example view 1300 illustrating a method for setting a function executed based on a touch to a rear surface of an electronic device 101 according to various embodiments.

Referring to FIG. 13, in an embodiment, the processor 440 may set a touch input to the rear surface of the electronic device 101 (e.g., a touch input to the second portion of the display 410) and a function corresponding to the touch input to the rear surface of the electronic device 101.

In an embodiment, as shown in FIG. 13, the processor 440 may display, through the display 410, a screen 1310 for setting the function for performing the function of the electronic device 101 (hereinafter, referred to as a 'rear touch function') based on the touch to the rear surface of the electronic device 101.

In an embodiment, the processor 440 may display, through the display 410, an object 1312 for setting whether to activate the rear touch function, along with the information 1311 indicating the rear touch function.

In an embodiment, the processor 440 may display, through the display 410, information 1321 indicating rear touch inputs (e.g., touch inputs to the second portion of the display 410) and information 1331 indicating the functions of the electronic device 101 respectively corresponding to the rear touch inputs, set by the user input, in the rear touch function.

However, the method for setting the rear touch function is not limited to the example described with reference to FIG. 13.

Figure 14:
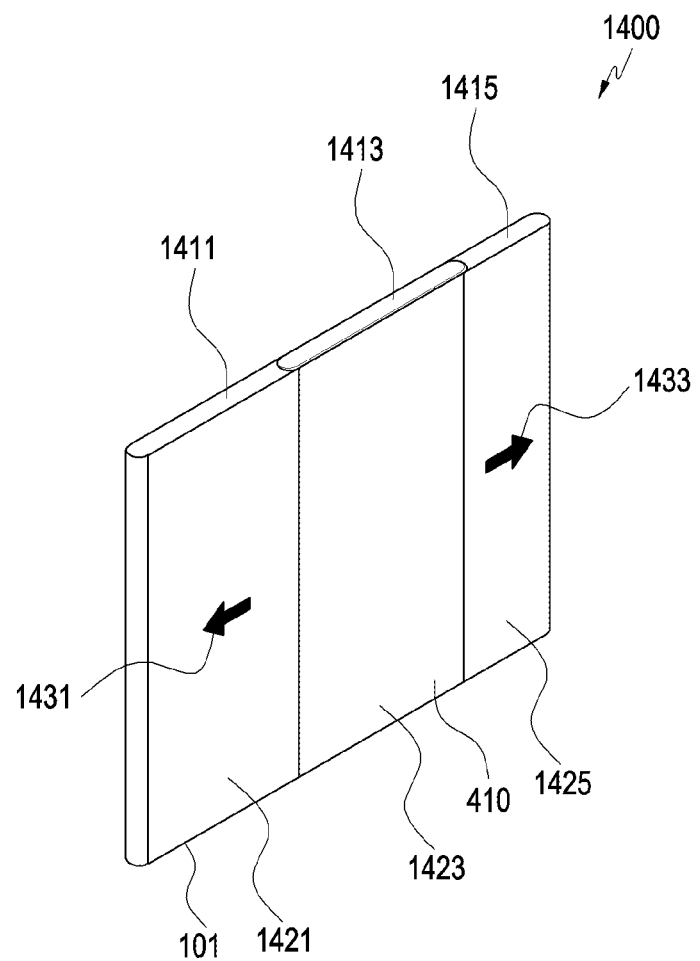
FIG. 14 is a view illustrating an electronic device according to various example embodiments.

FIG. 14 is a view 1400 illustrating an electronic device 101 according to various embodiments.

Referring to FIG. 14, in an embodiment, an electronic device 101 may include a first structure 1411 and a third structure 1415 that may slide in two opposite directions (e.g., movable in the directions of arrows 1431 and 1433) and a second structure 1413 to allow the first structure 1411 and the third structure 1415 to be received or extended.

In an embodiment, when the first structure 1411 and the third structure 1415 are in a state of being closed with respect to the second structure 1413, the first portion 1421 of the display 410 which may be visually exposed to the outside as the first structure 1411 slides and the third portion 1425 of the display 410 which may be visually exposed to the outside as the third structure slides may not be visually exposed to the outside.

In an embodiment, when the first structure 1411 and the third structure 1415 are in a state of being opened with respect to the second structure 1413 (or an intermediate state between the closed state and the opened state), the first portion 1421, the second portion 1423, and the third portion 1425 of the display 410 may be visually exposed to the outside.

In an embodiment, even when the electronic device 101 includes the first structure 1411 and the third structure 1415 which are slidable in two opposite directions with respect to the second structure 1413, the examples described above in connection with FIGS. 2 to 13 may be applied in the same or similar manner. For example, in the closed state, intermediate state, or opened state, the electronic device 101 may perform the function of the electronic device 101 based on a touch input to the rear surface of the electronic device 101.

Figure 15:
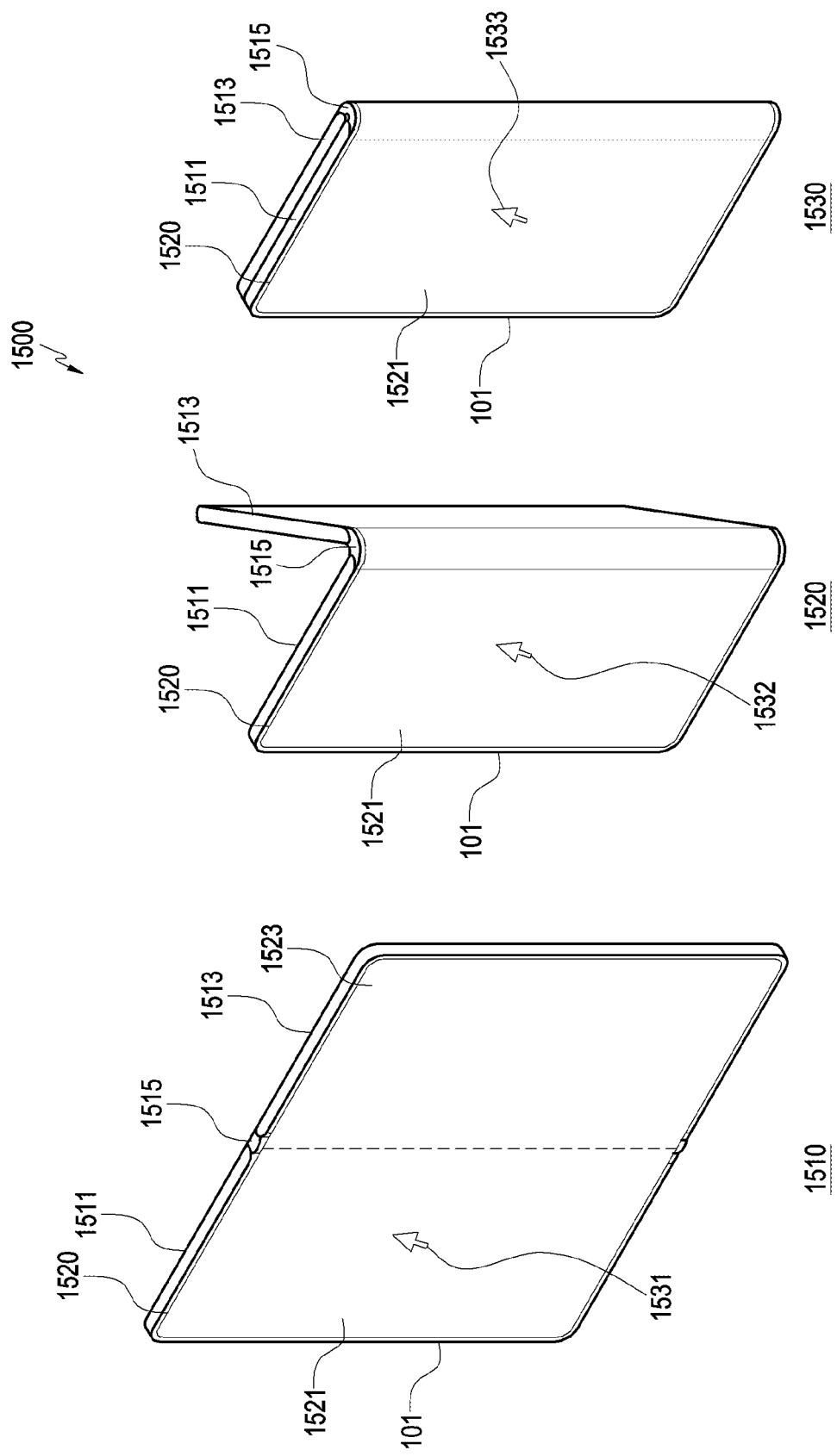
FIG. 15 is an example view illustrating a method for operating an electronic device including a foldable display according to various example embodiments.

FIG. 15 is an example view 1500 illustrating an operation method of an electronic device 101 including a foldable display 410 according to various embodiments.

Referring to FIG. 15, in an embodiment, the electronic device 101 may be implemented to be foldable or unfoldable.

For example, as shown by reference number 1510, in the fully unfolded state (hereinafter, referred to as an 'unfolded state') of the electronic device 101, the first area 1521 of the display 1520 and the second area 1523 of the display 1520 may have the same direction. As shown by reference number 1530, in the fully folded state (hereinafter, referred to as a 'folded state') of the electronic device 101 as the electronic device 101 is rotated about the hinge shaft 1515 (as at least one of the first housing 1511 or the second housing 1513 is rotated about the hinge shaft 1515), the direction in which the first area of the display 1520 faces may be opposite to the direction in which the second area of the display 1520 faces. For example, in the fully folded state of the electronic device 101, the first area of the display 1520 and the second area of the display 1520 may face each other. Reference number 1520 may denote an intermediate state (hereinafter, referred to as an 'intermediate state') between the fully unfolded state and fully folded state of the electronic device 101.

In an embodiment, the processor 440 may identify whether the state of the electronic device 101 is the unfolded state, folded state, or intermediate state through a sensor (e.g., at least one of an accelerometer or a hall sensor included in the electronic device 101).

In an embodiment, the processor 440 may operate in the first mode or second mode as described above in connection with FIGS. 4 to 11. For example, the processor 440 may perform the function of the electronic device 101 in the first mode.

In an embodiment, in the first mode, the processor 440 may perform the function related to the screen displayed through the display 1520 based on a touch input to the rear screen of the electronic device 101, as the screen opposite to the front surface of the electronic device 101 where the display 1520 is visually exposed to the outside in the unfolded state of the electronic device 101. For example, in the first mode, the processor 440 may perform the function related to the screen displayed through the display 1520, using the cursor 1531 displayed through the display 1520, based on a touch input to the rear surface of the electronic device 101 in the unfolded state of the electronic device 101.

In an embodiment, in the first mode, the processor 440 may perform the function related to the screen displayed through a portion of the display 1520 exposed toward the user in the display 1520, based on a touch input to the portion of the display 1520 exposed in the direction opposite to the direction toward the user in the display 1520 in the folded state of the electronic device 101. For example, in the first mode, the processor 440 may perform the function related to the screen displayed through the display 1520, using the cursor 1533 displayed through the display 1520, based on a touch input to the portion of the display 1520 exposed in the direction opposite to the direction toward the user in the display 1520 in the folded state of the electronic device 101.

In an embodiment, the processor 440 may perform the function related to the screen displayed through a portion of the display 1520 exposed in the direction toward the user in the display 1520, based on a touch input to the portion of the display 1520 forming a predetermined angle with the portion of the display 1520 exposed in the direction toward the user in the display 1520 in the folded state while the electronic device 101 is in the intermediate state. For example, in the first mode, the processor 440 may perform the function related to the screen displayed through the display 1520, using the cursor 1532 displayed through the display 1520, based on a touch input to the portion of the display 1520 forming a predetermined angle with the portion of the display 1520 exposed in the direction toward the user in the display 1520 while the electronic device 101 is in the intermediate state.

In an embodiment, the processor 440 may convert the touch input to the display 1520 using at least one of the first scheme or the second scheme, as described above in connection with FIGS. 4 to 11. The processor 440 may perform the function of the electronic device 101 based on the converted touch input.

Although FIG. 15 exemplifies the electronic device 101 which is folded in the out-folding type so that the first area 1521 of the display 1520 and the second area 1523 of the display 1520 face each other in the fully folded state of the electronic device 101, example embodiments are not limited thereto. For example, the above-described examples may be similarly or identically applied to the electronic device 101 which is folded in the in-folding type so that the direction in which the first area of the display 1520 and the direction in which the second area of the display 1520 are opposite to each other in the fully folded state of the electronic device 101.

Although FIG. 15 exemplifies the electronic device 101 in which at least one of the first housing 1511 or the second housing 1513 is rotated about one hinge shaft (e.g., the hinge shaft 1515), example embodiments are not limited thereto. For example, the above-described examples may be identically or similarly applied to the electronic device 101 which is implemented so that the plurality of housings are rotatable about a plurality of hinge shafts. As another example, the above-described examples may be identically or similarly applied to the electronic device 101 in which the display 1520 is flexibly transformable (e.g., the entire display 1520 is flexibly foldable or bendable) without a hinge shaft.

Figure 16:
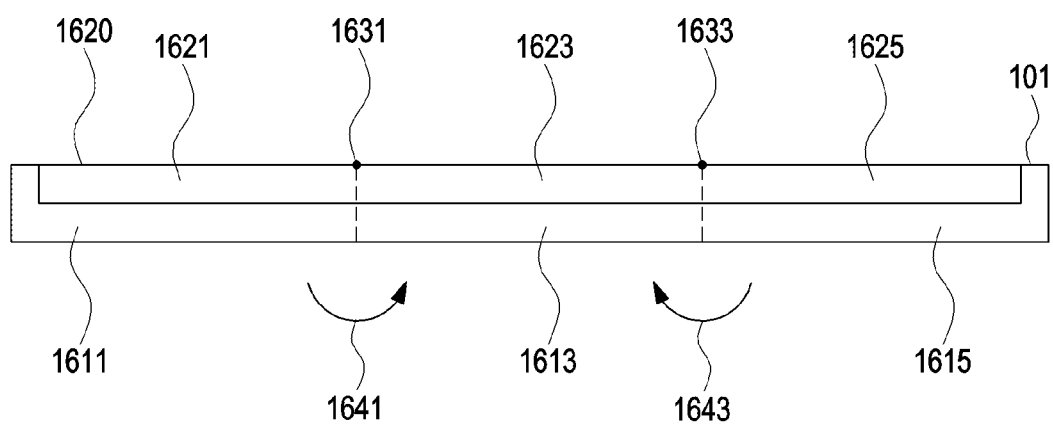
FIG. 16 is an example view illustrating a method for operating an electronic device including a multi-foldable display according to various example embodiments.

FIG. 16 is an example view illustrating a method for operating an electronic device 101 including a multi-foldable display according to various embodiments.

Referring to FIG. 16, in an embodiment, the electronic device 101 may be implemented to be foldable or unfoldable.

In an embodiment, as shown in FIG. 16, the electronic device 101 may be in a state in which the first housing 1611, the second housing 1613, and the third housing 1615 are fully unfolded. In the electronic device 101, the first housing 1611 may be rotated about the first hinge shaft 1631 with respect to the second housing 1613 as in the direction indicated by the arrow 1641, or the third housing 1615 may be rotated about the second hinge shaft 1633 with respect to the second housing 1613 as in the direction indicated by the arrow 1643. In an embodiment, the electronic device 101 may become the fully folded state as the first housing 1611 and the third housing 1615 are rotated with respect to the second housing 1613.

In an embodiment, the first area 1621 of the display 1620 may be a portion of the display 1620 corresponding to the first housing 1611, the second area 1623 of the display 1620 may be a portion of the display 1620 corresponding to the second housing 1613, and the third area 1625 of the display 1620 may be a portion of the display 1620 corresponding to the third housing 1615.

In an embodiment, even when the first housing 1611 and/or third housing 1615 of the electronic device 101 is rotated about two hinge shafts with respect to the second housing 1613 as shown in FIG. 16, the examples described above in connection with FIG. 15 may be applied in an identical or similar manner. For example, in the fully unfolded state, fully folded state, or intermediate state of the electronic device 101 (e.g., a state in which the first housing 1611 is unfolded with respect to the second housing 1613, and the third housing 1615 is folded with respect to the second housing 1613, or a state in which the third housing 1615 is unfolded with respect to the second housing 1613, and the first housing 1611 is folded with respect to the second housing 1613), the function of the electronic device 101 may be performed based on a touch input to the rear surface of the electronic device 101.

In an embodiment, although FIG. 16 exemplifies the electronic device 101 which is folded in the out-folding type from the fully unfolded state of the electronic device 101, so that the first area 1621 and third area 1625 of the display face in the direction opposite to the direction in which the second area 1623 of the display 1620 faces, example embodiments are not limited thereto. For example, the above-described examples may be applied to electronic devices which are folded or unfolded in the in-folding type in an identical or similar manner.

Although FIG. 16 exemplifies the electronic device 101 in which the first housing 1611 and/or the third housing 1615 is rotated about two hinge shafts (e.g., the hinge shafts 1631 and 1633), example embodiments are not limited thereto. For example, the above-described examples may be identically or similarly applied to the electronic device 101 which is implemented so that the plurality of housings are rotatable about three or more hinge shafts. As another example, the above-described examples may be identically or similarly applied to the electronic device 101 in which the display 1620 is flexibly transformable (e.g., the entire display 1620 is flexibly foldable or bendable) without a hinge shaft.

According to various embodiments, a method for operating an electronic device 101 may comprise obtaining information about a state of a first structure 201 with respect to a second structure 202, through at least one sensor 420 of the electronic device 101 including the first structure 201, the second structure 202 guiding a slide of the first structure 201, a flexible display 410 at least partially received in an inside of the second structure 202 or visually exposed to an outside of the second structure 202 according to the slide of the first structure 201, and the at least one sensor 420, detecting a touch input through the at least one sensor 420, identifying a portion of the flexible display 410, where the touch input is detected, of a first portion visually exposed to the outside and a second portion received in the inside of the second structure 202 in the flexible display 410, based on the information about the state of the first structure 201 with respect to the second structure 202, and when the identified portion is the second portion, performing a function related to a screen displayed through the first portion, based on the touch input.

In various embodiments, the state of the first structure 201 with respect to the second structure 202 may be a state in which the first structure 201 is closed with respect to the second structure 202, a state in which the first structure 201 is opened with respect to the second structure 202, or an intermediate state between the closed state and the opened state.

In various embodiments, obtaining the information about the state of the first structure 201 with respect to the second structure 202 may include obtaining the information about the first structure 201 with respect to the second structure 202 through at least one of a touch sensor, a hall sensor, an inertial sensor, a pressure sensor, an optical sensor, or an illuminance sensor.

In various embodiments, performing the function related to the screen displayed through the first portion may include converting the touch input to the second portion into a touch input to the first portion, based on a position of a cursor displayed through the first portion.

In various embodiments, performing the function related to the screen displayed through the first portion may include converting a position of a touch to the second portion into a position for the first portion corresponding to the position of the touch to the second portion.

In various embodiments, the method may further comprise identifying a mode of the electronic device 101 of a first mode of performing the function based on a touch input to the second portion and a second mode of not performing the function based on the touch input to the second portion. Performing the function related to the screen displayed through the first portion may include, when the mode of the electronic device 101 is the first mode, and the identified portion is the second portion, performing the function related to the screen displayed through the first portion, based on the touch input.

In various embodiments, the method may further comprise detecting a touch input to the second portion set to switch the second mode to the first mode while the electronic device 101 operates in the second mode and switching the second mode to the first mode based on the touch input to the second portion.

In various embodiments, the method may further comprise setting the function corresponding to the touch input to the second portion based on a user input.

In various embodiments, the method may further comprise detecting a hovering input to a portion where the flexible display 410 is not disposed in the second structure 202 through the at least one sensor 420 and performing the function related to the screen displayed through the first portion, based on the hovering input.

In various embodiments, the method may further comprise detecting a touch input to a curved portion with respect to a rotational axis of a roller of the electronic device 101 in the second portion, through the at least one sensor 420 and performing the function related to the screen displayed through the first portion, based on the touch input to the curved portion.

Further, the structure of the data used in example embodiments may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

Preferable example embodiments have been described above. Those of ordinary skill in the art to which the disclosure pertains will understand that the disclosure may be implemented in a modified form without departing from the essential characteristics of the disclosure. Hence, the methods disclosed herein should be interpreted not as limiting but as illustrative. The scope of the disclosure is shown in the claims rather than in the above-described description. All differences within their equivalent range should be construed as included in this disclosure.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a housing including a first housing and a second housing, wherein the first housing is configured to movably engage with the second housing between a retracted position and an extended position;
a flexible display coupled to the first housing and the second housing such that a size of an area of the flexible display that is visible from a front side of the housing changes as the first housing is moved between the retracted position and the extended position, wherein the retracted position is a position in which the size of the area of the flexible display is a minimum and the extended position is a position in which the size of the area of the flexible display is a maximum;
at least one sensor;
memory; and
at least one processor operably connected with the flexible display, the at least one sensor, and the memory,
wherein the memory stores instructions configured to, when executed by the at least one processor, cause to the electronic device to:
obtain, information about a state of the first housing with respect to the second housing via the at least one sensor, the information including a current position of the first housing relative to the retracted position and/or the extended position;
detect a touch input;
identify a portion of the flexible display, where the touch input is detected, between a first portion of the flexible display that is visible from the front side of the housing and a second portion of the flexible display that is not visible from the front side of the housing, based on the information about the state of the first housing with respect to the second housing, wherein the first portion of the flexible display and the second portion of the flexible display are changeable by the current position of the first housing relative to the retracted position and/or the extended position;
based on the identified portion being the second portion, convert the detected touch input into a first touch input on the first portion and perform, based on the first touch input on the first portion, a function related to a screen displayed via the first portion; and
based on the identified portion being the first portion, perform the function related to the screen displayed via the first portion, based on the detected touch input.

2. The electronic device of claim 1, wherein the state of the first housing with respect to the second housing, is at least one of: a state in which the first housing is closed with respect to the second housing, a state in which the first housing is opened with respect to the second housing, or an intermediate state between the closed state and the opened state.

3. The electronic device of claim 1, wherein the instructions are configured to, when executed by the at least one processor, cause to the electronic device to obtain the information about the state of the first housing with respect to the second housing through at least one of a touch sensor, a hall sensor, an inertial sensor, a pressure sensor, an optical sensor, an illuminance sensor, or a rotational angle sensor.

4. The electronic device of claim 1, wherein the instructions are configured to, when executed by the at least one processor, cause to the electronic device to convert the detected touch input to the second portion into the first touch input to the first portion, based on a position of a cursor displayed via the first portion.

5. The electronic device of claim 1, wherein the instructions are configured to, when executed by the at least one processor, cause to the electronic device to convert a position of the detected touch to the second portion into a position for the first portion corresponding to the position of the detected touch input to the second portion.

6. The electronic device of claim 1, wherein the instructions are configured to, when executed by the at least one processor, cause to the electronic device to:
identify a mode of the electronic device between a first mode of performing the function based on a touch input to the second portion and a second mode of not performing the function based on the touch input to the second portion; and
based on the mode of the electronic device being the first mode, and the identified portion being the second portion, perform, based on the detected touch input, the function related to the screen displayed via the first portion.

7. The electronic device of claim 6, wherein the instructions are configured to, when executed by the at least one processor, cause to the electronic device to:
detect a touch input to the second portion set to switch the second mode to the first mode while the electronic device operates in the second mode; and
switch the second mode to the first mode based on the touch input to the second portion.

8. The electronic device of claim 1, wherein the instructions are further configured to, when executed by the at least one processor, cause to the electronic device to set the function corresponding to the touch input to the second portion based on a user input.

9. The electronic device of claim 1, wherein the instructions are configured to, when executed by the at least one processor, cause to the electronic device to:
detect a hovering input to a portion where the flexible display is not disposed in the second housing via the at least one sensor; and
perform the function related to the screen displayed via the first portion, based on the hovering input.

10. The electronic device of claim 1, wherein the instructions are further configured to, when executed by the at least one processor, cause to the electronic device to:
detect a touch input to a curved portion with respect to a rotational axis of a roller of the electronic device in the second portion, via the at least one sensor; and
perform the function related to the screen displayed via the first portion, based on the touch input to the curved portion.

11. A method comprising: obtaining, information about a state of a first housing of an electronic device with respect to a second housing of the electronic device via at least one sensor of the electronic device, the information including a current position of the first housing relative to a retracted position and/or an extended position, the electronic device comprising a housing including the first housing and the second housing, a flexible display, and the at least one sensor, wherein the first housing is configured to movably engage with the second housing between the retracted position and the extended position, wherein the flexible display is coupled to the first housing and the second housing such that a size of an area of the flexible display that is visible from a front side of the housing changes as the first housing is moved between the retracted position and the extended position, wherein the retracted position is a position in which the size of the area of the flexible display is a minimum and the extended position is a position in which the size of the area of the flexible display is a maximum; detecting a touch input; identifying a portion of the flexible display, where the touch input is detected, between a first portion of the flexible display that is visible from the front side of the housing and a second portion of the flexible that is not visible from the front side of the housing, based on the information about the state of the first housing with respect to the second housing, wherein the first portion of the flexible display and the second portion of the flexible display are changeable by the current position of the first housing relative to the retracted position and/or the extended position; and based on the identified portion being the second portion, converting the detected touch input into a first touch input on the first portion and performing, based on the first touch input on the first portion, a function related to a screen displayed via the first portion; and based on the identified portion being the first portion, performing the function related to the screen displayed via the first portion, based on the detected touch input.

12. The method of claim 11, wherein the state of the first housing with respect to the second housing is at least one of: a state in which the first housing is closed with respect to the second housing, a state in which the first housing is opened with respect to the second housing, or an intermediate state between the closed state and the opened state.

13. The method of claim 11, wherein obtaining the information about a state of a first housing with respect to a second housing comprises obtaining the information about the state of the first housing with respect to the second housing through at least one of a touch sensor, a hall sensor, an inertial sensor, a pressure sensor, an optical sensor, an illuminance sensor or a rotational angle sensor.

14. The method of claim 11, wherein performing the function related to the screen displayed via the first portion includes converting the detected touch input to the second portion into a touch input to the first portion, based on a position of a cursor displayed via the first portion.

15. The method of claim 11, wherein performing the function related to the screen displayed via the first portion includes converting a position of the detected touch input to the second portion into a position for the first portion corresponding to the position of the detected touch input to the second portion.

16. The method of claim 11, further comprising identifying a mode of the electronic device between a first mode of performing the function based on a touch input to the second portion and a second mode of not performing the function based on the touch input to the second portion, wherein performing the function related to the screen displayed via the first portion includes, when the mode of the electronic device is the first mode, and the identified portion is the second portion, performing, based on the detected touch input, the function related to the screen displayed via the first portion.

17. The method of claim 16, further comprising:
detecting a touch input to the second portion set to switch the second mode to the first mode while the electronic device operates in the second mode; and
switching the second mode to the first mode based on the touch input to the second portion.

18. The method of claim 11, further comprising:
setting the function corresponding to the touch input to the second portion based on a user input.

19. The method of claim 11, further comprising:
detecting a hovering input to a portion where the flexible display is not disposed in the second housing, via the at least one sensor; and
performing the function related to the screen displayed via the first portion, based on the hovering input.

20. A non-transitory computer-readable medium having recorded thereon computer executable instructions, the computer executable instructions configured to, when executed by at least one processor of an electronic device, cause the electronic device to: obtain, information about a state of a first housing of the electronic device with respect to a second housing of the electronic device via at least one sensor of the electronic device, the information including a current position of the first housing relative to a retracted position and/or an extended position, the electronic device comprising a housing including the first housing and the second housing, a flexible display, and the at least one sensor, wherein the first housing is configured to movably engage with the second housing between the retracted position and the extended position, wherein the flexible display is coupled to the first housing and the second housing such that a size of an area of the flexible display that is visible from a front side of the housing changes as the first housing is moved between the retracted position and the extended position, wherein the retracted position is a position in which the size of the area of the flexible display is a minimum and the extended position is a position in which the size of the area of the flexible display is a maximum; detect a touch input; identify a portion of the flexible display, where the touch input is detected, between a first portion of the flexible display that is visible from the front side of the housing and a second portion of the flexible that is not visible from the front side of the housing, based on the information about the state of the first housing with respect to the second housing, wherein the first portion of the flexible display and the second portion of the flexible display are changeable by the current position of the first housing relative to the retracted position and/or the extended position; and based on the identified portion being the second portion, convert the detected touch input into a first touch input on the first portion and perform, based on the first touch input on the first portion, a function related to a screen displayed via the first portion; and based on the identified portion being the first portion, perform the function related to the screen displayed via the first portion, based on the detected touch input.

* * * * *